United States Patent
Shany et al.

(10) Patent No.: US 10,544,558 B2
(45) Date of Patent: Jan. 28, 2020

(54) SPILL CONTAINMENT BOOM

(71) Applicant: HARBO Technologies Ltd., Tel-Aviv (IL)

(72) Inventors: Arnon Shany, Moshav Neve Yarak (IL); Haim Greenberg, Ramat-Gan (IL); Boaz Ur, Tel-Aviv (IL)

(73) Assignee: HARBO Technologies Ltd., Tel-Aviv (IL)

( * ) Notice: Subject to any disclaimer, the term of this patent is extended or adjusted under 35 U.S.C. 154(b) by 0 days.

(21) Appl. No.: 15/518,494

(22) PCT Filed: Oct. 14, 2015

(86) PCT No.: PCT/IL2015/051025
§ 371 (c)(1),
(2) Date: Apr. 12, 2017

(87) PCT Pub. No.: WO2016/059637
PCT Pub. Date: Apr. 21, 2016

(65) Prior Publication Data
US 2017/0233967 A1  Aug. 17, 2017

Related U.S. Application Data

(60) Provisional application No. 62/153,415, filed on Apr. 27, 2015, provisional application No. 62/063,605, filed on Oct. 14, 2014.

(51) Int. Cl.
*E02B 15/08* (2006.01)

(52) U.S. Cl.
CPC ...... *E02B 15/0871* (2013.01); *E02B 15/0807* (2013.01); *E02B 15/0864* (2013.01); *E02B 15/0878* (2013.01); *E02B 15/0885* (2013.01)

(58) Field of Classification Search
CPC .. E02B 15/08; E02B 15/0814; E02B 15/0828; E02B 15/0878
(Continued)

(56) References Cited

U.S. PATENT DOCUMENTS 2,853,006 A * 9/1958 Moir ............ F42B 22/08
102/406
3,126,669 A * 3/1964 Gausewitz ......... A63H 23/02
446/160
(Continued)

FOREIGN PATENT DOCUMENTS

CN        2350436     11/1999
CN       201103116     8/2008
(Continued)

OTHER PUBLICATIONS

Applicant-Initiated Interview Summary dated Dec. 14, 2016 From the US Patent and Trademark Office Re. U.S. Appl. No. 14/394,281 (3 pages).
(Continued)

*Primary Examiner* — Benjamin F Fiorello
*Assistant Examiner* — Edwin J Toledo-Duran

(57) ABSTRACT

Some embodiments of the invention relate to a spill containment boom unit for deployment in ambient water, using water absorbing material, such as SAP, to encourage expansion of a chamber thereof. Some embodiments provide boom units which comprise one or more surfaces which form at least one hollow chamber, wherein at least one wall of the hollow chamber comprises at least one fillable compartment.

46 Claims, 19 Drawing Sheets

(58) Field of Classification Search
USPC .................................................. 405/63, 65–68
See application file for complete search history.

(56) References Cited

U.S. PATENT DOCUMENTS

| | | | |
|---|---|---|---|
| 3,237,414 A | 3/1966 | Straub et al. | |
| 3,248,939 A * | 5/1966 | Silverstein | B63B 22/24 |
| | | | 73/170.34 |
| 3,321,923 A | 5/1967 | Smith et al. | |
| 3,476,246 A * | 11/1969 | Dahan | E02B 15/06 |
| | | | 210/776 |
| 3,499,290 A * | 3/1970 | Smith | E02B 3/062 |
| | | | 405/72 |
| 3,499,291 A | 3/1970 | Mikkelsen | |
| 3,503,512 A | 3/1970 | Desty et al. | |
| 3,563,036 A | 2/1971 | Smith et al. | |
| 3,567,019 A | 3/1971 | Headrick | |
| 3,581,899 A | 6/1971 | Hunter et al. | |
| 3,592,008 A * | 7/1971 | Trindle | E02B 15/08 |
| | | | 405/70 |
| 3,608,316 A * | 9/1971 | Manuel | E02B 15/08 |
| | | | 405/68 |
| 3,638,429 A | 2/1972 | Sladek et al. | |
| 3,650,406 A | 3/1972 | Brown et al. | |
| 3,653,213 A * | 4/1972 | Childers | E02B 15/08 |
| | | | 405/63 |
| 3,662,891 A * | 5/1972 | Headrick | E02B 15/048 |
| | | | 210/242.3 |
| 3,664,504 A | 5/1972 | Ayers et al. | |
| 3,708,982 A * | 1/1973 | Blockwick | E02B 15/08 |
| | | | 405/70 |
| 3,744,253 A | 7/1973 | Williams et al. | |
| 3,756,031 A | 9/1973 | Smith et al. | |
| 3,798,911 A * | 3/1974 | Oberg | E02B 15/08 |
| | | | 405/69 |
| 3,818,708 A * | 6/1974 | Benson | E02B 15/04 |
| | | | 405/65 |
| 3,828,380 A * | 8/1974 | Lebovits | B63B 22/18 |
| | | | 441/21 |
| 3,844,122 A * | 10/1974 | Bliss, Jr. | B65D 88/78 |
| | | | 405/108 |
| 3,845,633 A * | 11/1974 | Hammond | B63B 43/18 |
| | | | 405/211 |
| 3,849,989 A * | 11/1974 | Preus | E02B 15/08 |
| | | | 405/68 |
| 3,859,796 A * | 1/1975 | Benson | E02B 15/04 |
| | | | 405/64 |
| 3,883,433 A * | 5/1975 | March | E02B 15/048 |
| | | | 210/242.3 |
| 3,901,753 A | 8/1975 | Öberg | |
| 3,919,847 A * | 11/1975 | Ballu | E02B 15/08 |
| | | | 405/63 |
| 3,922,860 A | 12/1975 | Tanksley | |
| 3,922,862 A * | 12/1975 | Vidilles | E02B 15/08 |
| | | | 405/70 |
| 3,935,690 A * | 2/1976 | Lea | B65B 5/045 |
| | | | 53/397 |
| 3,958,521 A * | 5/1976 | Memoli | B65D 88/78 |
| | | | 405/71 |
| RE28,966 E | 9/1976 | Blockwick | |
| 3,998,060 A | 12/1976 | Preus | |
| 4,030,304 A * | 6/1977 | West | E02B 15/08 |
| | | | 405/70 |
| 4,065,923 A * | 1/1978 | Preus | E02B 15/06 |
| | | | 405/70 |
| 4,068,478 A * | 1/1978 | Meyers | E02B 15/08 |
| | | | 405/66 |
| 4,123,911 A * | 11/1978 | Finigan | E02B 15/08 |
| | | | 405/68 |
| 4,124,981 A | 11/1978 | Preus | |
| 4,174,186 A * | 11/1979 | Kasai | E02B 3/062 |
| | | | 405/71 |
| 4,188,155 A * | 2/1980 | Langermann | E02B 15/08 |
| | | | 405/63 |
| 4,244,819 A * | 1/1981 | Ballu | E02B 15/08 |
| | | | 210/242.3 |
| 4,260,285 A * | 4/1981 | Kurihara | E02B 15/08 |
| | | | 405/68 |
| 4,270,874 A * | 6/1981 | March | E02B 15/08 |
| | | | 405/63 |
| 4,295,755 A * | 10/1981 | Meyers | E02B 15/08 |
| | | | 405/63 |
| 4,295,756 A | 10/1981 | Blair | |
| 4,319,858 A | 3/1982 | Jaffrennou et al. | |
| 4,329,747 A * | 5/1982 | Russell | A47G 9/062 |
| | | | 5/420 |
| 4,330,223 A | 5/1982 | Webb | |
| 4,333,463 A | 6/1982 | Holtman | |
| 4,487,151 A * | 12/1984 | Deiana | B63B 35/38 |
| | | | 114/249 |
| 4,639,227 A * | 1/1987 | Rademakers | B63B 22/04 |
| | | | 343/709 |
| 4,650,368 A | 3/1987 | Bayer | |
| 4,652,173 A * | 3/1987 | Kallestad | E02B 15/08 |
| | | | 405/69 |
| 4,711,067 A * | 12/1987 | Magni | B65B 63/02 |
| | | | 53/116 |
| 4,749,600 A | 6/1988 | Cullen et al. | |
| 4,781,493 A * | 11/1988 | Fischer | E02B 15/08 |
| | | | 405/63 |
| 4,802,791 A * | 2/1989 | Fisher | E02B 15/08 |
| | | | 405/63 |
| 4,894,964 A * | 1/1990 | Thrift | E04B 1/26 |
| | | | 52/199 |
| 4,930,171 A * | 6/1990 | Frantz | A47C 7/021 |
| | | | 297/DIG. 1 |
| 4,964,758 A * | 10/1990 | Pekelny | E02B 15/08 |
| | | | 405/66 |
| 4,998,845 A | 3/1991 | Smith | |
| 5,020,940 A | 6/1991 | Smith | |
| 5,040,918 A * | 8/1991 | Taricco | E02B 15/08 |
| | | | 405/66 |
| 5,071,286 A * | 12/1991 | Separovich | E02B 15/08 |
| | | | 405/66 |
| 5,074,709 A * | 12/1991 | Stensland | E02B 15/08 |
| | | | 405/68 |
| 5,102,261 A * | 4/1992 | Gunderson, III | E02B 15/06 |
| | | | 405/70 |
| 5,110,236 A | 5/1992 | Santamaria | |
| 5,120,159 A | 6/1992 | Smith | |
| 5,152,636 A | 10/1992 | Myers | |
| 5,173,008 A * | 12/1992 | Thorell | E02B 15/08 |
| | | | 405/68 |
| 5,195,844 A | 3/1993 | Goans | |
| 5,197,821 A * | 3/1993 | Cain | E02B 15/08 |
| | | | 405/68 |
| 5,201,607 A * | 4/1993 | Whidden, Jr. | E02B 15/08 |
| | | | 405/68 |
| 5,238,327 A * | 8/1993 | Blair | E02B 15/08 |
| | | | 405/68 |
| 5,308,191 A * | 5/1994 | Goans | E02B 15/08 |
| | | | 405/63 |
| 5,317,770 A * | 6/1994 | Sakurai | A61G 7/0504 |
| | | | 5/625 |
| 5,328,607 A * | 7/1994 | Soule | E02B 15/045 |
| | | | 210/242.3 |
| 5,362,180 A * | 11/1994 | Canning | E02B 15/08 |
| | | | 405/63 |
| 5,372,455 A * | 12/1994 | Tarca | E02B 15/08 |
| | | | 405/68 |
| 5,374,211 A * | 12/1994 | Imazato | B63C 9/02 |
| | | | 114/365 |
| 5,376,345 A * | 12/1994 | Pfefferle | B01D 53/9454 |
| | | | 219/553 |
| 5,433,994 A | 7/1995 | McKinney et al. | |
| 5,480,262 A | 1/1996 | Russo, III | |
| 5,522,674 A * | 6/1996 | Cooper | E02B 15/08 |
| | | | 210/242.1 |
| 5,547,313 A | 8/1996 | Holland | |
| 5,580,185 A | 12/1996 | Ware | |

(56) References Cited

U.S. PATENT DOCUMENTS

| | | | |
|---|---|---|---|
| 5,695,300 A | 12/1997 | Echols et al. | |
| 5,711,634 A | 1/1998 | Oberg | |
| 5,885,451 A | 3/1999 | Porrovecchio, Sr. | |
| 5,900,195 A * | 5/1999 | Pool | B29C 44/1242 264/46.5 |
| D427,323 S * | 6/2000 | Lihan | D25/39 |
| 6,073,382 A * | 6/2000 | Willener | A01K 79/00 210/242.3 |
| 6,085,628 A * | 7/2000 | Street | D07B 1/20 441/23 |
| 6,115,954 A * | 9/2000 | Willener | A01K 79/00 210/242.3 |
| 6,767,162 B2 * | 7/2004 | Meyers | E02B 3/062 114/267 |
| 6,797,857 B2 | 9/2004 | Tanhehco | |
| 6,860,677 B2 | 3/2005 | Johnston | |
| 6,942,422 B2 * | 9/2005 | Byrd | E02B 15/08 405/63 |
| 7,090,432 B2 * | 8/2006 | Jackson | B08B 17/00 405/66 |
| 7,172,367 B2 * | 2/2007 | Jeory | E02B 15/08 405/63 |
| 7,497,643 B2 * | 3/2009 | Carnahan | E02B 3/04 405/25 |
| 8,007,202 B2 * | 8/2011 | Davis | B63G 9/04 114/263 |
| 8,398,334 B1 | 3/2013 | Doyle | |
| 8,450,389 B1 | 5/2013 | Barefoot | |
| 8,622,650 B2 | 1/2014 | Lifton | |
| 8,721,220 B2 | 5/2014 | Fore, III | |
| 8,821,363 B1 | 9/2014 | Barefoot | |
| 9,206,575 B2 * | 12/2015 | Miller | E02B 15/047 |
| 9,487,926 B1 * | 11/2016 | Miller | E02B 15/047 |
| 9,683,345 B2 * | 6/2017 | Joiner | E02B 15/08 |
| 9,739,023 B2 * | 8/2017 | Shany | E02B 15/06 |
| 9,808,726 B2 * | 11/2017 | Johnson | A63G 21/18 |
| 9,809,942 B2 * | 11/2017 | Miller | E02B 15/047 |
| 2002/0018695 A1 | 2/2002 | Johnson | |
| 2006/0099033 A1 | 5/2006 | Boraggina | |
| 2007/0238373 A1 * | 10/2007 | Henrikson | B63B 22/22 441/6 |
| 2009/0000876 A1 | 1/2009 | Ablabutyan et al. | |
| 2010/0150655 A1 * | 6/2010 | Kilvert | B63C 9/08 405/68 |
| 2010/0278591 A1 | 11/2010 | Tasker | |
| 2011/0221199 A1 | 9/2011 | Boyce | |
| 2011/0280660 A1 | 11/2011 | Bahukudumbi et al. | |
| 2011/0318109 A1 | 12/2011 | Miller et al. | |
| 2012/0020732 A1 | 1/2012 | Stiles et al. | |
| 2014/0076298 A1 | 3/2014 | Meggs et al. | |
| 2014/0190389 A1 * | 7/2014 | Montousse | B63C 11/22 114/315 |
| 2014/0213662 A1 | 7/2014 | Boris et al. | |
| 2015/0065974 A1 | 3/2015 | Michiels et al. | |
| 2015/0086270 A1 | 3/2015 | Shany et al. | |
| 2017/0306580 A1 | 10/2017 | Shany et al. | |

FOREIGN PATENT DOCUMENTS

| | | |
|---|---|---|
| CN | 201531015 | 7/2010 |
| CN | 101956386 | 1/2011 |
| DE | 4237185 | 5/1994 |
| EP | 0033238 | 8/1981 |
| GB | 1383315 | 2/1974 |
| JP | 49-021946 | 5/1974 |
| JP | 49-062927 | 9/1974 |
| WO | WO 91/05918 | 5/1991 |
| WO | WO 91/08348 | 6/1991 |
| WO | WO 92/09750 | 6/1992 |
| WO | WO 92/09751 | 6/1992 |
| WO | WO 92/09752 | 6/1992 |
| WO | WO 2004/072413 | 8/2004 |
| WO | WO 2008/023094 | 2/2008 |
| WO | WO 2008/132461 | 11/2008 |
| WO | WO 2011/163383 | 12/2011 |
| WO | WO 2012/011937 | 1/2012 |
| WO | WO 2013/156998 | 10/2013 |
| WO | WO 2016/059637 | 4/2016 |
| WO | WO 2019/021272 | 1/2019 |

OTHER PUBLICATIONS

Communication Pursuant to Article 94(3) EPC dated Nov. 3, 2016 From the European Patent Office Re. Application No. 13777827.0. (5 Pages).

Communication Relating to the Results of the Partial International Search dated Jan. 14, 2016 From the International Searching Authority Re. Application No. PCT/IL2015/051025.

International Preliminary Report on Patentability dated Jan. 3, 2017 From the International Preliminary Examining Authority Re. Application No. PCT/IL2015/051025. (33 Pages).

International Preliminary Report on Patentability dated Oct. 30, 2014 From the International Bureau of WIPO Re. Application No. PCT/IL2013/050325.

International Search Report and the Written Opinion dated Aug. 11, 2013 From the International Searching Authority Re. Application No. PCT/IL2013/050325.

International Search Report and the Written Opinion dated Apr. 12, 2016 From the International Searching Authority Re. Application No. PCT/IL2015/051025.

Notification of Office Action and Search Report dated Sep. 28, 2015 From the State Intellectual Property Office of the People's Republic of China Re. Application No. 201380031112.7 and Its Translation of Office Action in English.

Notification of Office Action dated Jun. 3, 2016 From the State Intellectual Property Office of the People's Republic of China Re. Application No. 201380031112.7.

Official Action dated Jan. 23, 2017 From the US Patent and Trademark Office Re. U.S. Appl. No. 14/394,281. (23 pages).

Official Action dated Aug. 24, 2016 From the US Patent and Trademark Office Re. U.S. Appl. No. 14/394,281.

Official Action dated Mar. 24, 2016 From the US Patent and Trademark Office Re. U.S. Appl. No. 14/394,281.

Official Action dated Sep. 24, 2015 From the US Patent and Trademark Office Re. U.S. Appl. No. 14/394,281.

Supplementary European Search Report and the European Search Opinion dated Nov. 26, 2015 From the European Patent Office Re. Application No. 13777827.0.

Translation of Notification of Office Action dated Jun. 3, 2016 From the State Intellectual Property Office of the People's Republic of China Re. Application No. 201380031112.7.

Written Opinion dated Aug. 4, 2015 From the Intellectual Property Office of Singapore Re. Application No. 11201406559V.

Written Opinion dated May 16, 2016 From the Intellectual Property Office of Singapore Re. Application No. 11201406559V.

Written Opinion dated Nov. 28, 2016 From the Intellectual Property Office of Singapore Re. Application No. 11201406559V. (7 Pages).

Written Opinion dated Sep. 28, 2016 From the International Preliminary Examining Authority Re. Application No. PCT/IL2015/051025.

Fang et al. "Optimization of an Oil Boom Arrangement", Proceedings of the International Oil Spill Conference, 2001(2): 1367-1374, Mar. 2001.

Communication Pursuant to Article 94(3) EPC dated Oct. 6, 2017 From the European Patent Office Re. Application No. 13777827.0. (5 Pages).

ASTM "Standard Specification for Oil Spill Response Boom Connection: Slide Connector", ASTM International, Designation F 2438-04, p. 1-5, Dec. 2004.

Notice of Intention to Refuse Patent Application and Examination Report dated Oct. 26, 2017 From the Intellectual Property Office of Singapore, IPOS Re. Application No. 11201406559V. (8 Pages).

Search Report and Written Opinion dated Dec. 1, 2017 From the Intellectual Property Office of Singapore, IPOS Re. Application No. 11201702883T. (10 Pages).

(56) References Cited

OTHER PUBLICATIONS

Requisition by the Examiner dated Nov. 20, 2018 From the Canadian Intellectual Property Office Re. Application No. 179300. (2 pages).
Requisition by the Examiner dated Dec. 28, 2018 From the Innovation, Science and Economic Development Canada, Canadian Intellectual Property Office Re. Application No. 2,870,384. (6 Pages).
International Search Report and the Written Opinion dated Nov. 6, 2018 From the International Searching Authority Re. Application No. PCT/IL2018/050806. (14 Pages).
Office Action dated Nov. 25, 2018 From the Israel Patent Office Re. Application No. 61534. (2 pages).
Notice of Amendment dated Jul. 5, 2018 From the State Intellectual Property Office of the People's Republic of China Re. Application No. 201830031303.9 and Its Translation Into English.
Notice of Eligibility for Grant and Examination Report dated Oct. 19, 2018 From the Intellectual Property Office of Singapore, IPOS Re. Application 11201702883T. (5 Pages).
Notification of Reason for Rejection dated Sep. 20, 2018 From the Japanese Patent Office Re. Application No. 2018-001323.
Restriction Official Action dated Nov. 2, 2018 From the US Patent and Trademark Office Re. U.S. Appl. No. 29/611,603. (16 pages).
Examination Review Report dated Jan. 21, 2019 From the Intellectual Property Office of Singapore Re. Application No. 11201406559V. (10 Pages).
Notification of Office Action and Search Report dated Oct. 15, 2018 From the State Intellectual Property Office of the People's Republic of China Re. Application No. 201580060860.7 and Its Summary in English. (14 Pages).
Office Action dated Sep. 2, 2018 From the Israel Patent Office Re. Application No. 61534 (3 pages).
Official Action dated Oct. 4, 2018 From the US Patent and Trademark Office Re. U.S. Appl. No. 15/644,852. (32 pages).
Translation Dated Oct. 25, 2018 of Notification of Office Action dated Oct. 15, 2018 From the State Intellectual Property Office of the People's Republic of China Re. Application No. 201580060860.7. (13 Pages).
Alamy "Floating Containment Boom", retrieved from alamy.com, 1 Page, 2018.
Alamy "High Seas Oil Containment Boom in the Mediterranean Ocean", retrieved from alamy.com, 1 Page, 2018.
Alibaba "Oil Spill Containment Boom", retrieved from alibaba.com, 1 Page, 2018.
Chinacsw "Harbor Floating Spill Containment Boom", retrieved from chinacsw.com, 1 Page, 2018.
Chinacsw "Silt Curtain, Oil Containment Boom and Oil Spill Containment Berm", retrieved from Chinacsw.com, 1 Page, 2018.
Ipieca "The Global Oil and Gas Industry Association for Environmental and Social Issues", retrieved from ipieca.org, 48 Pages, 2015.
Mavideniz "Oil Fence Boom", retrieved from mavideniz.com, 1 Page, 2018.
Nautic Expo "Harbor Boom", retrieved from nauticexpo.com, 1 Page, 2018.
Shutterstock "Containment Boom Temporary Floating Barrier Used Stock Photo", retrieved from Shutterstock.com, 1 Page, 2018.
Notice of Allowance dated Feb. 4, 2019 From the US Patent and Trademark Office Re. U.S. Appl. No. 29/611,603. (10 pages).
Official Action dated Apr. 4, 2019 From the US Patent and Trademark Office Re. U.S. Appl. No. 15/644,852. (32 pages).
Notice of Reasons for Rejection dated May 10, 2019 From the Japan Patent Office Re. Application No. 2017-540340 and Its Translation (Summary) Into English. (26 Pages).

\* cited by examiner

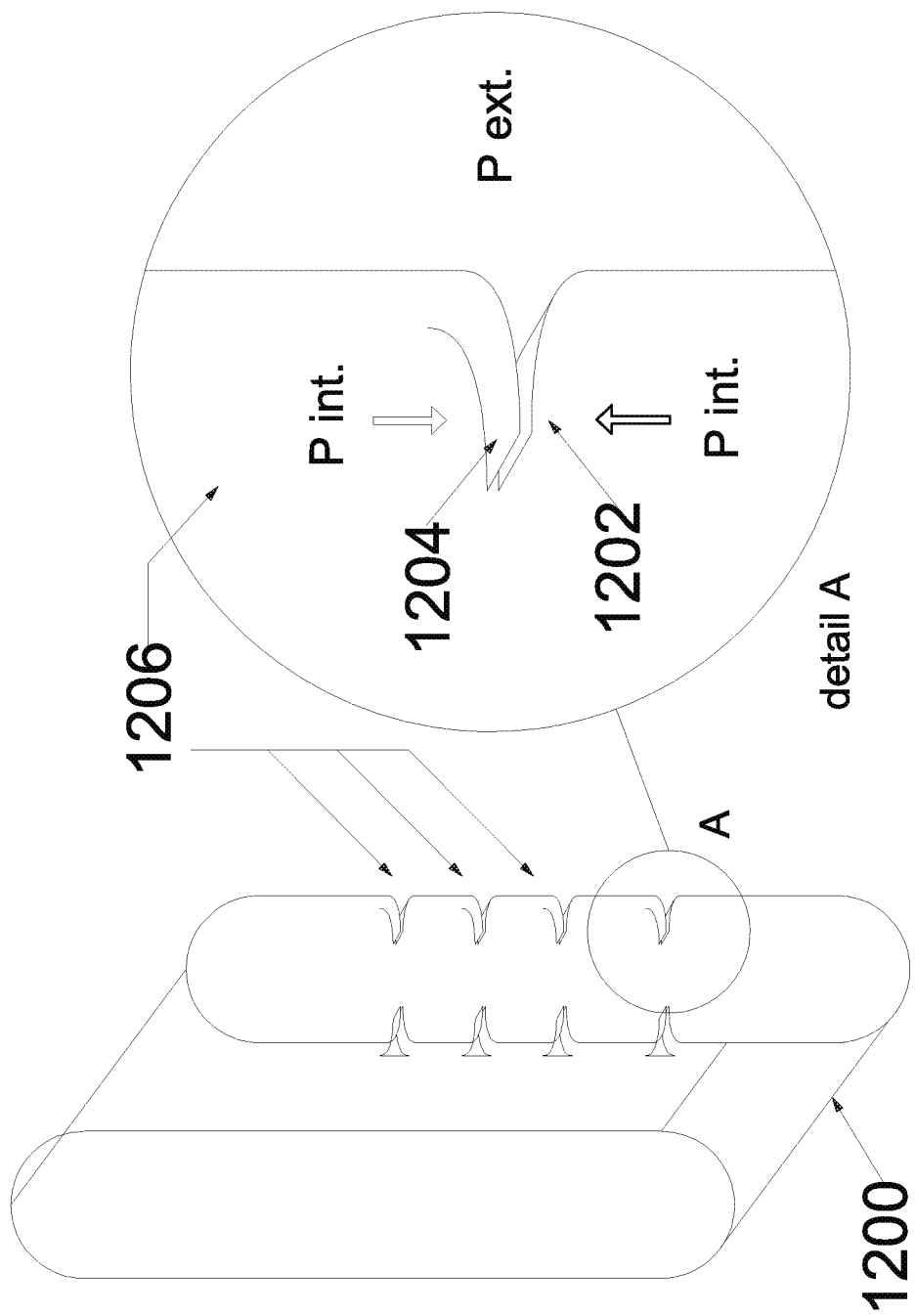

SPILL CONTAINMENT BOOM

RELATED APPLICATIONS

This application is a National Phase of PCT Patent Application No. PCT/IL2015/051025 having International filing date of Oct. 14, 2015, which claims the benefit of priority and under 35 USC 119(e) of U.S. Provisional Patent Application Nos. 62/063,605, filed on Oct. 14, 2014 and 62/153,415, filed on Apr. 27, 2015. The contents of the above applications are all incorporated by reference as if fully set forth herein in their entirety.

PCT Patent Application No. PCT/IL2015/051025 is also related to PCT Patent Application No. PCT/IL2013/050325, filed on Apr. 14, 2013, (Publication No. WO2013/156998), the contents of which are incorporated herein by reference.

FIELD AND BACKGROUND OF THE INVENTION

The present invention, in some embodiments thereof, relates to an oil spill containment boom and, more particularly, but not exclusively, to a lightweight boom comprising geometry suitable for stabilizing the boom.

U.S. Pat. No. 3,563,036 A to Blair et al. titled "Inflatable floating booms" teaches an "Accordion-folding floating booms for confining spilled oil or other floating material incorporating a thin continuous flexible fin positioned vertically and provided with numerous, short, inflatable balloon-like float pockets mounted along its upper edge. The float pockets are all deflatable and collapsible for compact accordion-folded stowage of the boom in limited volumes of space for storage, shipment and delivery to the site by water transport or by airdrop. Automatic inflation of successive inflatable float pockets upon unfolding deployment of the booms is achieved by individual pressure sources actuated by the deployment process, providing inflation pressure to produce fully inflated expansion of the float pockets for buoyant floatation of the boom structure. Compressed gas charge cylinders triggered by unfolding of the boom supply the desired inflation pressure. Alternatively, chemical reactants enclosed in adjacent enclosures are mixed together upon unfolding deployment of the boom to produce sufficient amounts of gaseous reaction product to provide inflation pressures required for each buoyant balloon-like float pocket. This invention relates to accordion-folding floating booms for confining floating material such as spilled oil, and particularly to quickly deployable booms which may be stored compactly folded in small cargo volumes and which may be deployed quickly and easily by unfolding and inflating to place them into operating condition surrounding spilled oil or other floating material to be confined".

U.S. Pat. No. 5,197,821A to Cain et al., titled "Lightweight, rapid deployment oil spill containment boom" teaches "An emergency, lightweight marine containment system is comprised of a containment crate in which is flatly accordion folded an uninflated boom curtain. The boom curtain is comprised of a self-inflating flotation chamber on one longitudinal edge with an integral depending curtain terminating in a self-inflating ballast chamber on the opposing longitudinal edge. The flotation chamber is inflated by gas and the ballast chamber is inflated by the water or sea water into which the boom curtain is disposed. The boom curtain is made of lightweight single-ply or multiple-ply sheet material".

SUMMARY OF THE INVENTION

Some embodiments of the inventions are illustrated by the following examples, noting that some embodiments of the invention include features from any number of examples.

Example 1. A spill containment boom unit for deployment in ambient water in an axially extending arrangement, comprising:

one or more surfaces which form at least one hollow chamber with walls substantially surrounding the chamber in a plane transverse to said axis, wherein at least one wall of said hollow chamber comprises at least one fillable compartment.

Example 2. The boom unit according to example 1, wherein said hollow chamber is configured to assist in stabilizing a structure of said boom unit against externally acting forces.

Example 3. The boom unit according to any of the preceding examples, wherein said hollow chamber is defined by a plurality of locking points, said locking points restricting at least some movement of said surfaces or portions of a surface relative to each other to maintain said boom unit structure stabilized and/or to prevent said chamber from opening or changing shape or angle.

Example 4. The boom unit according to any of the preceding examples, wherein said hollow chamber is defined by a plurality of bending regions which are parts of the boom structure adapted to bend and are thinner than fillable or filled parts of said boom.

Example 5. The boom unit of example 4, comprising at least one elastic or shape memory element positioned and strong enough to provide force for folding said boom unit into a deployed shape.

Example 6. The boom unit of according to any of examples 1-5, wherein said fillable compartment is filled with gas release by a gas release or generation mechanism which is part of the boom and wherein said mechanism comprises a plurality of welded seams, some weaker than others to allow crushing of said unit to cause mixing of gas precursors and not release gas out of the boom.

Example 7. The boom unit according to any of the preceding examples, wherein said fillable compartment comprises a water absorbing material which absorbs water when said boom unit is deployed and expands in volume by a factor of at least 5.

Example 8. The boom unit of example 7, wherein said fillable chamber includes at least one porous wall or wall with openings sized to allow water ingress and prevent said material from exiting.

Example 9. The boom unit of example 8, wherein at least some of said openings are provided in a fabric.

Example 10. The boom unit of example 8, wherein at least some of said openings are in the form of closable valves which self-close when said fillable chamber fills.

Example 11. The boom unit of any of examples 7-10, wherein said absorbing material is provided mounted on a backbone.

Example 12. The boom unit of any of examples 7-11, wherein said absorbing material is provided adhered to a wall of said compartment.

Example 13. The boom unit of any of examples 7-12, wherein said absorbing material is provided in a porous packet.

Example 14. The boom unit of any of examples 7-13, wherein said absorbing material is mixed with an absorption enhancing material.

Example 15. The boom unit according to any of the preceding examples, wherein said fillable compartment acts as a beam for maintaining said chamber open.

Example 16. The boom unit according to example 1, wherein said hollow chamber comprises a triangular cross section profile.

Example 17. The boom unit according to example 16, wherein said at least one fillable compartment, when viewed at a cross section of said hollow chamber, is a hypotenuse relative a long axis of said boom unit which is substantially perpendicular to the water surface, and relative to the water surface.

Example 18. The boom according to any of the preceding examples, comprising at least one connecting element for connecting between compartments and which comprises an element inserted at production stage of the boom and has a mechanism that is locked when the boom is deployed and keeps the boom open.

Example 19. The boom unit according to any of the preceding examples, wherein said hollow chamber at least partially limits movement of ambient fluid when said boom unit is deployed, such that a stability of said unit is increased.

Example 20. The boom unit according to any of the preceding examples, wherein said boom unit comprises an underwater portion and an above water portion, said hollow chamber is configured in one or both of said underwater portion and said above water portion and said ambient fluid is ambient water and wherein said under water portion extending to a distance of 20-50 cm below water surface.

Example 21. The boom unit of any of the preceding examples, comprising at least one tensile element between compartments or a rigid or semi-rigid element within compartments or between compartments and which assists in maintaining said chamber open.

Example 22. The boom unit according to any of the preceding examples, wherein said hollow chamber defines a geometry with a mathematical surface and said chamber is surrounded by walls defining a real inner surface of the chamber and wherein said inner surface includes an open area of between 5% and 50% of geometrical surface of the chamber.

Example 23. The boom unit of any of the preceding examples comprising a flotation chamber including a plurality of gas-filled sealed portions, prior to deployment thereof.

Example 24. The boom unit according to any of the preceding examples, further comprising one or more additional fillable compartments which do not form said hollow chamber.

Example 25. The boom unit according to example 24, wherein a below water portion of said boom unit comprises one or more ballast compartments arranged in an X-shaped cross section profile, and an above water portion of said boom unit comprises one or more flotation compartments.

Example 26. The boom unit according to any of the preceding examples, wherein said boom unit defines an A shaped cross section profile, wherein one or more ballast compartments form the legs of said A and one or more floatation compartments form the horizontally extending line of said A.

Example 27. The boom unit according to any of examples 1-26, wherein said boom unit defines a cross section profile including an X-like intersection under water and an upside-down V above water.

Example 28. A boom unit comprising at least one fillable compartment comprising a material which expands in volume by a factor of at least 5 when absorbing salt water, wherein said material is arranged in said compartment in conjunction with a structure that prevents migration thereof within the compartment.

Example 29. A boom unit according to example 28, wherein said structure comprises a wall of said compartment to which particles of said absorbing material are attached.

Example 30. A boom unit according to any of examples 28 and 29, wherein said structure comprises an insert to which said absorbing material is adhered.

Example 31. A boom unit according to any of examples 28-30, wherein said structure comprises an insert formed of a porous material within which said material is contained and which allows water ingress and prevents water-absorbed material exit and having a geometry corresponding to a geometry of the compartment in which the material is inserted.

Example 32. A boom unit according to any of examples 28-31, wherein said compartment comprises at least one rigid or semi rigid wall.

Example 33. A boom unit according to example 32, wherein said wall has at least one aperture for water ingress formed therein.

Example 34. A boom unit according to example 32 or 33, comprising at least one flexible wall and sufficient material to cause a distention of said wall when the material absorbs enough sea water.

Example 35. A boom unit according to any of examples 28-34, wherein said compartment comprises at least wall formed of a porous material.

Example 36. The boom unit according to any of examples 28-35, wherein said boom unit comprises an X-shaped cross section profile, and wherein said water absorbent material is a superabsorbent polymer (SAP).

Example 37. The boom unit of any of examples 28-36, wherein said structure comprises an insert and wherein said insert has a volume which is about the same or larger than that of said compartment.

Example 38. The boom unit according to any of examples 28-37, wherein said material is adhered to a wall of said compartment using a process in which adhesive is sprayed in a pattern matching the compartment and less than 80% of an inner surface of the compartment and then the material added.

Example 39. The boom unit of any of examples 28-38, wherein said absorbing material is attached using an adhesive.

Example 40. The boom unit of any of examples 28-36, wherein said structure comprises an insert and wherein said insert comprises a compressible open cell structure to which said material is adhered and/or inserted into.

Example 41. The boom unit according to any of examples 28-40, comprising an exothermic material mixed with or adjacent said water absorbing material and which generates heat when contacted with salt water, said exothermic material in a sufficient amount to heat the water absorbing material and/or ambient water to increase absorption rate by at least 30%.

Example 42. The boom unit according to any of examples 28-40, wherein said compartments of said boom unit comprise substantially only water absorbent material and/or associated structure, and the boom unit does not comprise any additional compartments.

Example 43. The boom unit according to any of examples 28-42, wherein said above water portion of said boom maintains said below-water portion of the boom at a perpendicular position relative to the water surface.

Example 44. The boom unit according to example 36, wherein one or more of said compartments contain an amount of SAP which when absorbed with water, solidifies to a volume at least 1% to 5% larger than a volume of said compartment, to apply pressure onto the internal walls of said compartment, thereby increasing a rigidity of said compartment.

Example 45. The boom unit according to example 36, wherein composite material fibers are added to said one or more of SAP containing compartments to increase the boom weight.

Example 46. A boom unit comprising at least one pre-filled and sealed chamber comprising a gas in an amount sufficient to provide at least 50% of a buoyancy of said boom unit.

Example 47. A method for increasing structural strength of a spill containment boom unit during deployment of said boom in ambient water, comprising:

filling at least one compartment of said boom unit with an amount of superabsorbent polymer (SAP) which when absorbed with water, solidifies to a volume at least 5% larger than a volume of said compartment to apply pressure onto the internal walls of said compartment, thereby increasing a rigidity of said compartment; and deploying said boom unit in ambient water to allow said SAP to absorb water.

Example 48. A spill containment boom unit comprising:

two or more compartments defining an X shaped cross section profile, wherein each of said compartments comprises an above water floating portion and a below water ballast portion;

at least one predefined rotational point configured at a crossing between said compartments, wherein a compartment is configured to pivot on said point relative to a longitudinal axis of said boom unit in response to external force acting on said compartment to increase a resistance of said boom unit to said external force.

Example 49. The boom unit according to example 48, wherein said external force acting on a floating portion of said compartment causes said compartment to pivot, moving said below water ballast portion of said compartment to a closer to perpendicular position relative to the water surface, wherein in said closer to perpendicular position said ballast portion extends deeper within the water to anchor said boom unit.

Example 50. The boom unit according to example 49, wherein said external force is caused by wind.

Example 51. A method for preparing a boom unit formed of one or more sleeve segments, said sleeve segment comprising one or more fillable compartments, comprising:

at least partially coupling said sleeve segments to each other;

allowing one or more of said fillable compartments to inflate, thereby locking said sleeve segments at one or more locking points to each other and defining a hollow chamber which is maintained open by said inflated compartments.

Example 52. A multidirectional spill containment boom unit comprising:

one or more compartments defining an X shaped cross section profile, said compartments containing a combination of gas and water, said boom unit adapted to remain at least partially above water and partially below water even when rotated around a central axis.

According to an aspect of some embodiments there is provided a spill containment boom unit for deployment in ambient water, comprising one or more surfaces which form at least one hollow chamber, wherein at least one wall of the hollow chamber comprises at least one inflatable compartment. In some embodiments, the hollow chamber is configured to stabilize a structure of the boom unit against externally acting forces. In some embodiments, the hollow chamber is defined by a plurality of locking points, the locking points restricting at least some movement of the surfaces or portions of a surface relative to each other to maintain the boom unit structure stabilized.

In some embodiments, the inflatable compartment is inflated with gas. In some embodiments, the inflatable compartment is inflated with water. In some embodiments, the inflatable compartment comprises a water absorbent material which absorbs water when the boom unit is deployed. In some embodiments, the expandable compartment acts as a beam for maintaining the chamber open. In some embodiments, the hollow chamber comprises a triangular cross section profile.

In some embodiments, at least one inflatable compartment, when viewed at a cross section of the hollow chamber, is a hypotenuse relative a long axis of the boom unit which is substantially perpendicular to the water surface, and relative to the water surface. In some embodiments, at least one of the locking points is configured to prevent the chamber from opening. In some embodiments, a surface is a boom sleeve segment comprising one or more of the inflatable compartments, and one or more sealed sleeve areas between the compartments. In some embodiments, the hollow chamber at least partially limits movement of ambient fluid when the boom unit is deployed. In some embodiments, the boom unit comprises an underwater portion and an above water portion, the hollow chamber configured on the underwater portion, and the ambient fluid is ambient water. In some embodiments, the boom unit comprises an underwater portion and an above water portion, the hollow chamber configured on an above water portion of the boom, and the ambient fluid is air. In some embodiments, the boom unit comprises an underwater portion and an above water portion, wherein a part of the hollow chamber is configured on said above water portion, and a part of the hollow chamber is configured on the below water portion.

In some embodiments, the boom unit comprise an underwater portion and an above water portion, the underwater portion extending to a distance of, for example, 20-50 cm below water surface. In some embodiments, walls of the hollow chamber are defined by at least one of one or more inflatable compartments and one or more connecting elements between the compartments. In some embodiments, the connecting element is a strap extending between two locking points. In some embodiments, the hollow chamber is sized to contain a volume of water sufficient for functioning as a weight which stabilizes the boom unit relative to the water surface. In some embodiments, at least one inflatable compartment is a floatation compartment. In some embodiments, the inflatable compartment extends sideways relative a long axis of the boom unit which is substantially perpendicular to the water surface. In some embodiments, the at least one inflatable compartment is a ballast compartment. In some embodiments, the boom unit further comprises one or more inflatable compartments which do not form the hollow chamber. In some embodiments, a below water portion of the boom unit comprises one or more ballast compartments arranged in an X- shaped cross section profile, and an above water portion of the boom unit comprises one or more flotation compartments. In some embodiments, the below water X-shaped structure comprises extensions configured above water to act as weights on top of the one or more floatation compartments of the boom unit. In some embodiments, the floatation compartments contain gas, and the ballast compartments contain water. In some embodiments, the boom unit defines an A shaped cross section profile, wherein one or more ballast compartments form the legs of the A and one or more floatation compartments form the horizontally extending line of the A. In some embodiments, the boom sleeve segments forming the surfaces are interleaved by a threaded connection.

According to an aspect of some embodiments there is provided a multidirectional spill containment boom unit comprising one or more compartments defining an X shaped cross section profile, the compartments containing a combination of gas and water, the boom unit adapted to remain at least partially above water and partially below water even when rotated around a central axis.

According to an aspect of some embodiments there is provided a spill containment boom unit configured to be balanced at least partially above water and at least partially below water by the net force of buoyancy and gravity, the boom unit comprising one or more compartments filled with a water-absorbent material, wherein a specific gravity of the water absorbent material when absorbed with water is smaller than that of water. In some embodiments, the boom unit comprises an X-shaped cross section profile, and wherein the water absorbent material is a superabsorbent polymer (SAP). In some embodiments, the compartments of the boom comprise water absorbent material only, and the boom unit does not comprise any additional compartments. In some embodiments, the above water portion of the boom maintains the below-water portion of the boom at a perpendicular position relative to the water surface. In some embodiments, one or more of the compartments contain an amount of SAP which when absorbed with water, solidifies to a volume at least 1% to 5% larger than a volume of the compartment, to apply pressure onto the internal walls of the compartment, thereby increasing a rigidity of the compartment. In some embodiments, composite material fibers are added to the one or more of SAP containing compartments to increase their weight.

According to an aspect of some embodiments there is provided a method for increasing structural strength of a spill containment boom unit during deployment of the boom in ambient water, comprising filling at least one compartment of the boom unit with an amount of superabsorbent polymer (SAP) which when absorbed with water, solidifies to a volume at least 5% larger than a volume of the compartment to apply pressure onto the internal walls of the compartment, thereby increasing a rigidity of the compartment; and deploying the boom unit in ambient water to allow the SAP to absorb water.

According to an aspect of some embodiments there is provided a spill containment boom unit comprising two or more compartments defining an X shaped cross section profile, wherein each of the compartments comprises an above water floating portion and a below water ballast portion; at least one predefined rotational point configured at a crossing between the compartments, wherein a compartment is configured to pivot on the point relative to a longitudinal axis of the boom unit in response to external force acting on the compartment to increase a resistance of the boom unit to the external force. In some embodiments, the external force acting on a floating portion of the compartment causes the compartment to pivot, moving the below water ballast portion of the compartment to a closer to perpendicular position relative to the water surface, wherein in the closer to perpendicular position the ballast portion extends deeper within the water to anchor the boom unit. In some embodiments, the external force is caused by wind.

According to an aspect of some embodiments there is provided a method for preparing a boom unit formed of one or more sleeve segments, the sleeve segment comprising one or more inflatable compartments, comprising at least partially coupling the sleeve segments to each other; allowing one or more of the inflatable compartments to inflate, thereby locking the sleeve segments at one or more locking points to each other and defining a hollow chamber which is maintained open by the inflated compartments.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 12 is a cross-sectional view of a chamber wall shaped to create a one way valve therein, in accordance with some embodiments of the invention;

DESCRIPTION OF SPECIFIC EMBODIMENTS OF THE INVENTION

Figure 1:
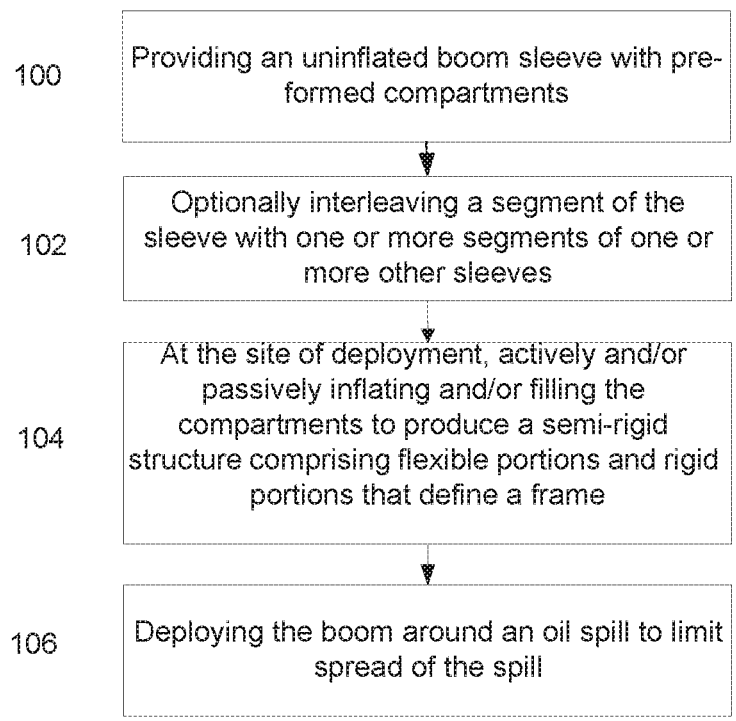
FIG. 1 is a flowchart of a method of preparing and deploying a boom for limiting spread of an oil spill, according to some embodiments of the invention.

The present invention, in some embodiments thereof, relates to an oil spill containment boom and, more particularly, but not exclusively, to a lightweight boom comprising a geometry suitable for stabilizing the boom.

A broad aspect of some embodiments of the invention relates to a boom which is adapted for rapid deployment at the site of a spill, such as an oil spill. Optionally, the boom is deployable immediately following detection of the spill, optionally using a relatively small deployment craft such as a boat, by a relatively small team.

A boom sleeve, as referred to herein, may include an elongated chain of a plurality of segments, each segment configured to be coupled to one or more segments of one or more additional sleeves to define a boom unit. Alternatively, the boom comprises of chained segments of a single sleeve. Optionally, segments of a first sleeve comprising floatation compartments are coupled to segments of a second sleeve comprising ballast compartments. A boom unit, as referred to herein, obtained by coupling the sleeve segments to each other, may include one or more floatation compartments coupled to one or more ballast compartments. For clarity, a cross section profile of a boom unit at one or more points along the boom unit is often described throughout this application. In some embodiments, the complete boom comprises a plurality of boom units chained one after the other.

Some embodiments of the invention relate to a boom unit comprising one or more floatation compartments, and one or more ballast compartments. In some embodiments, the floatation compartments contain a gas, such as air or CO2. In some embodiments, the ballast compartments contain fluid, such as water. In some embodiments, the boom unit as a whole does not comprise more than 1%, more than 5%, more than 10% material heavier than water. In some embodiments, the entire boom unit is filled with a material lighter than water, before deployment and/or after deployment.

An aspect of some embodiments relates to a boom unit comprising one or more sleeve segments coupled to each other to form a three dimensional structure which comprises at least one hollow chamber. In some embodiments, the sleeve segment comprises one or more inflatable and/or otherwise expandable compartments, and at least one of the compartments defines a wall of the hollow chamber. Optionally, the at least one inflatable compartment acts as a beam which maintains said hollow chamber open, preventing it from collapsing. In some embodiments, walls of the hollow chamber are formed of one or more inflatable compartments, and/or one or more connecting elements, (such as a baffle for example in the form of a strap) extending in-between compartments. In some embodiments, the inflatable compartment is filled with gas, water, a water absorbent material and/or a combination thereof. It is noted that some, alternative embodiments of the invention do not include such a hollow chamber and/or having a wall defined by a sleeve segment. Other features as described herein may be applied to such boom designs, in accordance with some embodiments of the invention.

In some embodiments, the hollow chamber is defined by a plurality of locking points. In some embodiments, at a locking point, movement of two or more sleeve segments relative to each other and/or movement of portions of a single segment relative to each other is at least partially restricted. In some embodiments, the structure defined by the locking points increases a structural strength of the boom unit. Optionally, by increasing the structural strength, the deployed boom unit is more resistant to external forces, such as forces caused by winds, waves, and/or currents, which may cause the boom unit to bend, fold, or otherwise collapse. Optionally, the boom unit is configured for responding to external forces in a manner that does not affect the functionality of the boom.

In some exemplary embodiments of the invention, the chamber is a closed chamber and does not include a side which is open over more than, for example, 20%, 40%, 80% of its surface. Optionally, the chamber is not open in a downwards direction.

A locking point, as referred to herein, may include, for example, a connection point between two more compartments, a crossing between compartments, a joint between portions of a single compartment, a bend of a compartment. In some embodiments, the locking point defines an interlocking between the attached segments. Optionally, the coupling at the locking point comprises an interference fit of one segment or a portion thereof with one or more segments or portions thereof. Such interference fit, for example, may be obtained by threading a segment portion into an opening of another segment, wherein the first segment portion is larger than the opening to prevent it from disengaging. Other coupling mechanisms at the locking points may include, for example, a threaded connection, an adhesive connection (e.g. using glue or a welding), use of a binding element, and/or other attachment mechanisms.

In some exemplary embodiments of the invention, coupling is by providing a relatively rigid section on one or both compartments and allowing the rigid section to interlock (e.g., with an interference fit or snap connection) to another rigid section. Optionally or alternatively, a rigid section compressively engages a soft section (e.g., a soft section on one compartment engaged by a slit in a rigid section). Optionally, such a rigid section is metal and/or plastic. In some exemplary embodiments of the invention, the interlocking is irreversible, for example, using a non-reversible geometrical interlocking. Optionally, the deployment mechanism includes one or more guides which guide the parts to be interlocked towards each other, for example, each part riding on a separate guides and the guides approximating each other.

Optionally, rigid sections and/or other parts of an interlocking are provided by molding the boom section to include a thicker and/or more rigid section and/or as an insert during manufacture (e.g., molding or extrusion). Optionally or alternatively, a rigid insert is added after forming the walls of the chamber and/or after closing the chamber (e.g., welding of walls). For example, the walls may be formed but not welded together, the insert inserted and welding performed. In another example, the insert is placed into a prepared chamber, for example, via an unsealed opening thereof, and the opening may remain unsealed.

As can be appreciated, in some embodiments, the locking points are regions and/or extend linearly. When viewing a cross-section of the boom, the locking areas may be points or small areas. However, in some embodiments, locking points extend along at least part of a length of a boom section and/or a plurality of locking points are provided along a section. In some embodiments, the rigid section is between 30% and 70% of a length, for example, about 50%, of the boom section, and may serve to create a combined strength to resist forces created by external forces like water currents.

It should be appreciated that locking points and interlocking methods may also be used for boom designs where no hollow chamber is defined, for example, if the boom sections interlock to provide an open structure. In some exemplary embodiments of the invention, the interlocking is used within a boom section to interlock parts of the boom, for example, during deployment, rather than (or in addition to) locking together different boom sections and/or sections along a length of a boom.

In some exemplary embodiments of the invention, interlocking interlocks boom sections by having one part of a boom pass through an opening or slit in another part of the boom. Optionally or alternatively, in some exemplary embodiments of the invention, interlocking is of inserts and/or extensions of the boom sections (e.g., semi-rigid or rigid molded parts thereof), rather than or in addition to the expandable sections of the boom sections.

In some embodiments, a cross section profile of the hollow chamber is triangular. In some embodiments, a compartment or a portion thereof extends to form a hypotenuse relative to a long axis of a cross section of the boom unit (i.e. an axis extending perpendicular to the water surface) and relative to a theoretical axis extending along the water surface. Alternatively, the hollow chamber comprises a different cross section profile, such as a hexagonal profile or other polygonal profile. Alternatively, the chamber comprises a rounded profile.

In some exemplary embodiments of the invention, the boom is generally axial and the chamber is surrounded at least on transverse sides by walls and/or fillable compartments. Optionally, at least some of the walls define apertures, for example allowing limited water flow in and/or out. Optionally, at least one of the openings acts as a valve, for example, a flap valve, interfering with water outflow. Optionally, considering the chamber as a geometrical shape defined by the walls, at most 50%, 40%, 30%, 20%, 10% or intermediate percentages of the surface area of the geometrical shape are open to free water flow. In some cases, a wall will extend axially part way and then include an aperture and then extend axially some more.

In some exemplary embodiments of the invention, the pores are sized and shaped to allow at least 50% of a volume of said compartment to fill within 20 minutes, 10 minutes, 5 minutes, 3 minutes, 1 minute, 30 seconds, 10 seconds and/or intermediate times.

In some exemplary embodiments of the invention, the volume of the geometric shape of the chamber is between 70% and 3000% (or more) of a volume of the fillable and/or filled chambers surrounding the chamber, for example, between 100% and 400% or between 200% and 1000%. This may allow a greater anchoring effect to be achieved with smaller expandable chambers and/or less material therein.

An aspect of some embodiments of the invention relates to a geometry of a boom unit in which the boom includes two or more ballast sections which extend sideways and downwards before extending inwards again. Optionally, the sections are connected at the meeting point. Optionally, a hollow chamber is formed between the extending sections. Alternatively, which a general shape of a chamber is formed, it has a large percentage of surface area open to flow. Alternatively, the shape of the chamber slows volumetric flow (of, for example, sea water) in and/or out of the volume of the chamber (e.g., as compared to flow without the chamber or any interfering element, by a factor of, for example, 2, 5, 10, 50, 100 or intermediate or greater factors.

An aspect of some embodiments of the invention relates to boom deployment by folding. In some exemplary embodiments of the invention, portions of the boom are welded together instead of or in addition to some interlocking. Optionally, the portions which fold, comprise two layers that are welded together, at least around their edges.

Optionally, the folding sections are selected so that when the boom deploys, expanding and/or expanded sections abut against each other. In some exemplary embodiments of the invention, structural elements, such as inserts and/or tensile elements assist in holding the deployed boom in a desired shape. For example, such a structural element forms one side of a triangle and two other sides are formed by expanding boom sections. When expanded, such a boom section is structurally rigid.

In accordance with some embodiments of the invention, a semi rigid film is a film that can be shaped into 3 dimensional structure by various methods. One method is an internal pressure in a flexible sleeve and another is by creating perpendicular ribs (usually using a thermoplastic processes). In some exemplary embodiments of the invention, a film shaped this way can perform as a wall with the ability to resist external forces. Semi-rigid walls retain some flexibility while still resisting collapsing under external forces.

In some exemplary embodiments of the invention, deployment is assisted by the use of shape memory material or other energy storage material such as elastic and sponge materials. For example, foam material maybe provided within and/or between compartments (optionally near fold locations, e.g., to reduce the volume of material needed). When stored, this foam of other shape memory materials (e.g., NiTi alloys and/or polymers) is compressed and when the boom is released, the foam returns to a previous configuration thereof, thereby assisting in or setting the shape of the deployed boom. In some exemplary embodiments of the invention, the energy released during this process is invested in changing the flat boom position into a desired three dimensional structure.

As described herein, relatively rigid structures may comprise one or more structural components formed from a rigid element, one or more formed by a tensile element (e.g., flexible), one or more formed by an expandable element and/or one or more formed by a pre-expanded element. In some exemplary embodiments of the invention, such components (e.g., optionally compartments) are attached and/or interconnected by one or more of welding, interlocking, connectors, and/or adhesion.

An aspect of some embodiments relates to interfering with motion of ambient fluid for stabilizing the boom unit. In some embodiments, when the boom is deployed, the hollow chamber limits at least some motion of ambient fluid, such as ambient water and/or ambient air. In some embodiments, the chamber comprises one or more openings though which fluid can flow. Optionally, a total surface area of the openings is no more than 20%, 30%, 40% or intermediate, larger or smaller percentages of a total internal surface of the chamber. In some embodiments, the chamber is sized to interfere with the motion of a volume of ambient fluid, such as ambient water, which is sufficient for stabilizing the boom unit. In some embodiments, the resistance of the chamber to motion of ambient fluid affects physical and/or mechanical characteristics of the boom unit, for example by effectively increasing a mass of the boom unit and/or a weight of the boom unit. Optionally, the chamber, by interfering with motion of at least some volume of fluid, affects the magnitude and/or direction of buoyancy forces acting on the boom unit.

A potential advantage of a boom structure comprising a chamber which is effective to function as a weighing element may include reducing the need for an external weight, such as a metal chain.

In some embodiments, external forces acting on the boom such as forces caused by under-water currents and/or forces caused by above-water winds which may tilt and/or otherwise destabilize the boom are at least partially resisted to by having the under-water chamber functioning as an anchoring element. Additionally or alternatively, the boom comprises a chamber configured on an above-water portion of the boom unit. Optionally, the above-water chamber interferes with at least some motion of air.

In some embodiments, stabilization of the boom unit involves maintaining an under-water portion of the boom at a substantially perpendicular alignment to the water surface. In some embodiments, a position of the above water floatation portion is selected to obtain and/or maintain the perpendicular alignment of the underwater portion, for example by a floatation portion comprising sideways extensions, extending away from a long axis of the cross section of the boom unit which passes through a center of gravity of the boom unit. In some embodiments, the above water portion of the boom unit is aero-dynamically shaped, to prevent lifting forces and/or increase water drag, for example by having the far tips of the extensions positioned slightly below the water level when the boom is deployed, so that a blow of wind might push the boom unit deeper into the water rather than lift it away from the water. A potential advantage of the "off-centered" structure of the floatation compartments may include utilizing buoyancy forces to stabilize and/or align an under-water portion of the boom.

In some embodiments, stabilization of the boom unit involves the use of semi-rigid sleeve segments, in which some portions (such as the inflatable compartments) are more rigid than others (such as sealed sleeve areas in between the compartments). In some embodiments, sealed sleeve areas are shaped and/or sized to provide flexibility, for example providing for the rigid portions to be moved, such as bent, relative to each other, to a certain extent. In some embodiments, the sealed sleeve areas are formed with one or more curves which reduce a risk of failure due to deformations caused when inflating and/or filling the compartments.

An aspect of some embodiments relates to a boom unit which is balanced at least partially above the water surface and at least partially below the water surface due to the net force of buoyancy forces and gravitational forces. In some embodiments, the boom unit contains a material which absorbs water, such as a superabsorbent polymer (SAP).

In some embodiments, the absorbed material comprises a specific gravity smaller than that of water. In an embodiment, the boom unit does not comprise any gas-inflatable compartments, and fillable compartments are absorbent-material filled compartments. Optionally, one or more gas prefilled (and/or sealed air) compartments is provided. Optionally, such components provide at least 30%, 50%, 70%, 80% or intermediate percentages of the buoyancy of the boom (or other object for salt water use).

In some embodiments, an amount of pre-absorbed SAP within the compartments is selected to increase a rigidity of at least some portions of the boom, for example by filling a compartment with an amount of SAP which when absorbed with water occupies a volume that is slightly larger than that of the closed compartment, for example 2%, 4%, 5% larger. Optionally, the absorbed, solidified SAP applies pressure onto the internal walls of the compartment, potentially increasing a rigidity of the compartment.

In some embodiments, fibers (including wires and/or other shapes, optionally flat and thin, optionally narrow and/or elongate) such as metal fibers and/or plastic inserts and/or composite material fibers are incorporated within the absorbent-material filled compartments, to increase a weight of the compartment and/or to reinforce the compartment and increase its structural strength. In an embodiment, a boom unit which is formed of one or more absorbent-material filled compartments comprises an X-shaped cross section profile.

A broad aspect of some embodiments of the invention relates to using SAP or other water absorbing materials with a device intended for use in water. In some exemplary embodiments of the invention, the SAP is used to provide rigidity to the device. Optionally or alternatively, the SAP is used to provide flotation or adding weight (or mass) to the device. Optionally or alternatively, the device includes fillable portions and all such fillable portions are pre-filled with SAP.

An aspect of some embodiments of the invention relates to structures which stabilize SAP particles (as an example of a water absorbing material) in a water-immersed device. In some exemplary embodiments of the invention, the device is a boom for preventing contaminated water and/or oil from extending past a boom.

In some exemplary embodiments of the invention, the structure is selected to prevent migration of SAP particles relative to a compartment geometry. Such migration may, for example, cause misshaping of the compartment and/or cause bunching and/or clogging at water entrances, which bunching may interfere with water ingress.

In some exemplary embodiments of the invention, the structures comprise adhesive, to reduce migration of SAP particles. Optionally, the adhesive is provided as a layer on an inner compartment wall of the device. Optionally, the adhesive is applied by spraying, for example, using a patterned sprayer to match the compartment layout pattern on the device. Optionally between 5% and 95% of an inner surface of the compartment is sprayed with adhesive and has SAP mounted thereon, for example, between 10% and 100% of one wall and/or between 20% and 70% of all the walls.

In some exemplary embodiments of the invention, the adhesive used to hold SAP in place is water soluble, optionally, to support releasing the SAP after a few (e.g., 1-72) seconds or minutes (e.g., 1-10), for example, after at least 30% or 50% of water absorption thereof happens.

Matching the compartment shape may be using other methods, for example, attaching the SAP to an appropriately shaped insert and/or providing it in an appropriately shaped bag.

In some exemplary embodiments of the invention, the structure comprises a backbone on which SAP is attached, for example, by adhesive. Optionally, this backbone is inserted into a device compartment during manufacture. In some exemplary embodiments of the invention, the backbone comprises or consists essentially of single or double sided tape to which SAP particles are attached and inserted into the compartment in a straight, bent or folded shape.

In some exemplary embodiments of the invention, SAP particles are provided inside a bag, optionally including one or more porous portions. This bag may be inserted into the device compartment. A potential advantage of using such a bag is during manufacturing, to prevent SAP particles from escaping and interfering with compartment formation. Optionally or alternatively, such a bag (and adhesives) may be useful to prevent SAP from escaping out of holes used to allow water to flow into the compartment.

Optionally or alternatively, SAP particles are provided in or on a sponge or other open-cell foam. Optionally, the sponge also acts as a shape memory/energy storage material to expand a compartment and/or boom unit.

Optionally or alternatively, the sponge is itself a water absorbing material, used instead of, or in addition to, SAP.

In some embodiments when an open cell material (e.g., sponge) is used, the sponge or other structure is inserted to the cell and compacted at manufacturing using Vacuum and optionally sealed with a plastic that melts in water, for example, Poly Venil Ethylin. Optionally, water ingress allows the structure to expand and also may assist in sucking water into the structure.

In some exemplary embodiments of the invention, a SAP bag or backbone are themselves the "compartment" and no separate compartment walls are provided, or such compartment is at least 50% by area, open.

In some exemplary embodiments of the invention, at least one wall of the compartment is semi rigid and/or includes a stiffening element, which may assist in maintaining a shape of the compartment and/or ensure a desired arrangement of SAP during water absorption thereby.

In some embodiments of the invention, compartment rigidity is achieved, at least in part by using semi rigid plastic parts (e.g., thermo-formed, vacuum formed, injected or using any other manufacturing mechanism) which define cells which are then filled with a proper amount of SAP. Optionally, the cell walls are punctured with holes of sizes that let water in but prevents the SAP-gel from exiting the cell. In some embodiments the SAP is packaged inside a material for example a non-woven fabric which is porous enough to allow water entry while resisting SAP gel exit. Optionally, this material serves as a liner and the semi rigid plastic as a shell. In some embodiments the semi rigid shell has large holes that enable the liner within to be exposed to water quickly. Optionally, at least 50% of the pores and/or 50% of the pore area is in pores having a maximal extent of between 100 and 300 microns.

An aspect of some embodiments of the invention relates to water-ingress into a compartment with SAP. In some exemplary embodiments of the invention, the ingress is via holes, the holes being selected to be small enough to prevent escape of SAP gel, but large enough and/or numerous enough to support sufficiently rapid ingress of water. Optionally, at least 50% of the pores and/or 50% of the pore area is in pores having a maximal extent of between 100 and 300 microns. In some exemplary embodiments of the invention, the holes define one way valves, for example, flap valves and/or pinch valves. Optionally, the valve is closed by expansion of SAP inside the compartment.

In some exemplary embodiments of the invention, the SAP is carried inside a unit having a porous layer. Optionally, this unit has at least one wall not common with the compartment. Optionally or alternatively, the layer is a fabric, for example, woven or non-woven. Optionally or alternatively, the layer is oleophobic (and/or a separate oleophobic layer added), to prevent oil from interfering with the SAP absorption and expansion.

In some embodiments the SAP is held inside a pocket made of a material that is perforated in such a way that water easily gets in but the SAP gel does not get out. Optionally, this material serves as a liner that holds the SAP within the boom compartments (e.g., similarly to an inner-tube in a tire).

In some embodiments a penetrable wall of the chamber is made of or includes a section made of a perforated film. Optionally, the holes are as large as possible to let water quickly in while still preventing the exit of activated SAP gel that has a bigger molecule size. For example, the holes can be between 100 and 300 microns in maximal extent and are optionally approximately square or round.

In embodiments that use an internal bag or non-woven tube or other structure that contains the SAP, larger holes (e.g., 0.5-2 or 5 mm) may be provided).

In some embodiments, a significant part or even most of the unit and/or chamber wall and/or chamber as a whole, are porous, for example, at least 25%, 40%, 50%, 70%, 80%, 90%, or intermediate percentages, by area.

An aspect of some embodiments of the invention relates to an amount of SAP placed in a chamber. Optionally, the amount is selected according to the use of the chamber (e.g., salt water or fresh water). Optionally or alternatively, the amount is selected according to the volume of the chamber. Optionally, while the chamber has a resting shape with one volume, deformation of the chamber (e.g., angles and/or surfaces) can result in a larger volume. Optionally, enough SAP is provided so that when expanded, the shape of the chamber will deform and the volume grow, for example, by at least 10%, 20%, 30% or intermediate percentages. It is noted this growth is beyond any expansion of the chamber from a collapsed state to a filled state.

An aspect of some embodiments of the invention relates to assisting rapid and/or uniform absorption of water by SAP and/or providing other desired properties to a filled compartment. In some exemplary embodiments of the invention, this relates to materials provided mixed with the SAP, on the SAP and/or the shape of SAP particles.

In some exemplary embodiments of the invention, oil-rejecting surfaces and/or particles are provided to reduce oil adhesion to the SAP.

In some exemplary embodiments of the invention, the two (largest) walls of SAP containing compartments are manufactured so that at least one wall functions as a barrier for oil and at least one wall is penetrable by water. In some embodiments the external side of the compartment is made of oleophobic material to keep oil away and maintaining an easy access for water.

In some exemplary embodiments of the invention, absorption is assisted by adding a heating material to the SAP and/or the compartment or unit. In some exemplary embodiments of the invention, the material exhibits an exothermic reaction with seawater and/or water, which may assists in the absorption process.

In some exemplary embodiments of the invention, other and/or additional materials are associated with the SAP. In one example a gas forming material, such as magnesium, calcium or barium which react with water to release hydrogen, is mixed with the Sap and generates gas bubbles (optionally trapped by the SAP particles) and/or which can enhance buoyancy.

In some exemplary embodiments of the invention, an oil repulsing material and/or coating is added to SAP.

In some embodiments of the invention, reflective material, for example, metal particles or fibers are added, to make the float more visible to radar. Optionally or additionally, corner reflectors or other geometric shapes (such as suitably sized gas bubbles) are added to improve sonar visibility.

In some exemplary embodiments of the invention, fibers, for example, between 1 mm and 30 mm or 300 mm long are added to the SAP and serve to enhance mechanical properties, such as by providing stiffening and/or reducing migration. Optionally, the fibers are adhesive (e.g., have an adhesive coating). Optionally or alternatively, the SAP particles are threaded on such fibers.

An aspect of some embodiments of the invention relates to a SAP particle shape which is configured to assist in water uptake. Optionally, the particles are made larger, so as to allow larger water ingress holes to be used. Optionally or alternatively, the particles are made flatter (e.g., ratio between thickness and square root of surface area is less than 0.5, 0.3, 0.1 or intermediate ratios). Optionally or alternatively, the particles are made smaller and/or non-smooth, to increase a relative surface area thereof. Optionally or alternatively, the particles are formed with one or more apertures, for example, a through hole, to increase surface area and/or reduce effective particle thickness (e.g., increasing absorption rate), while maintaining a relatively larger particle size.

A potential advantage of such geometries is the prevention and/or reduction of a phenomenon of blockage that sometimes is caused by "corks" that are created after some quantity of SAP absorbs water and changes to gel that stops the free flow of water to other areas of unactivated SAP.

An aspect of some embodiments relates to a boom unit which comprises one or more predefined points of rotation. In some embodiments, the points of rotation allow the boom to respond to externally applied forces in a manner which does not interfere with the boom's functionality. In some embodiments, a compartment of a boom unit or portion thereof is pivotable with respect a second compartment. In an example, an external force, for example caused by wind, acts on a floating portion of a compartment, causing the compartment to pivot with respect, for example, to a longitudinal axis of the boom, such that a ballast portion of the same compartment (configured under water) is rotated to obtain a closer to perpendicular position relative to the water surface.

Optionally, the ballast portion anchors deeper within the water, increasing the boom's resistance to being lifted and/or otherwise moved by the wind.

An aspect of some embodiments of the invention relates to boom sections that are pre-inflated. In some exemplary embodiments of the invention, a flotation part of a boom includes one or more sealed and prefilled gas compartments. Optionally, the compartments are formed between welded together polymer films. Optionally, the compartments are sufficient for all, or at least 50%, 70%, 90% or more of the flotation needs of the boom. Optionally, the boom is stored with the prefilled compartments.

A potential advantage of using prefilled compartments is that deployment may be simplified. It is noted that most of the boom is optionally formed of buoyancy neutral or near-neutral materials (e.g., density of 0.9-1.4 g/cm$^3$), so a small amount of air or other gas may be sufficient to provide buoyancy to the boom.

In some exemplary embodiments of the invention, at least 50% of the gas by volume is found in compartments having an interior volume of at least 0.1 cm$^3$, 1 cm$^3$, 5 cm$^3$ and/or 10 cm$^3$. Optionally, this excludes open or closed cell foam from acting as a prefilled gas storage element. However, in some embodiments, a sealed gas compartment may include a foam, for example, a sponge, for example, as shape memory material, for example as described herein.

In some exemplary embodiments of the invention, the thickness of a prefilled compartment of the boom is between 0.5 and 30 cm, for example, between 2 and 10 cm. Such a compartment may include a single or more than one layer of gas-filled portions.

Optionally, the walls of the boom section are themselves sealed to each other to form the gas holding regions, for example, with a same film acting as a gas storing element wall and as an external surface.

An aspect of some embodiments of the invention relates to using low amounts of material to fill an oil blocking boom. In some exemplary embodiments of the invention, gas volume is between 0.5 and 5 liters per meter of boom, for example, between 1 and 2 liters per meter.

In some exemplary embodiments of the invention, SAP is used for water absorption. Optionally, SAP is provided in a ratio of between 1:10 and 1:30, for example, about 1:20 between SAP weight and sea water weight of the desired volume to be taken up by SAP gel or higher ratios (e.g., 1:50, 1:100 or more, such as less than 1:500 for use of booms in fresh water.

In some exemplary embodiments of the invention, between 30 and 300 grams/meter of SAP are provided, for example, between 80 and 200, for example, about 100 grams/meter.

An aspect of some embodiments of the invention relates to in-situ gas generation in a boom for oil migration prevention. In some exemplary embodiments of the invention, a portion of the boom is formed of sealed together polymer sheets (which optionally also act as an external surface of boom). In some exemplary embodiments of the invention, different weld strength are provided within the portion. For example, a strong weld is provided to prevent gas escape to outside the boom, and a weaker weld is provided between compartments which hold gas precursors. During deployment, pressure on the portion may cause the weaker weld to burst, allowing the precursors to mix, generating gas to expand the section. Optionally, a medium strength weld is provided as a valve to allow gas exit into other parts of the boom. Optionally, this only opens once sufficient gas is produced and may prevent leakage of reactable precursors.

Optionally or alternatively, to using weaker and stronger welds, In some exemplary embodiments of the invention, a flow path of one precursor is through a compartment holding another precursor. Optionally, the compartment of the other precursor or a different geometry in the section (e.g., a semi-closed section), act as a mixing chamber for the two precursors.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a flowchart of a method of preparing and deploying a boom for limiting spread of an oil spill, according to some embodiments of the invention.

In some embodiments, a method for example as described herein is performed at the site of the spill, optionally immediately after a spill is detected. In some embodiments, the deployment craft carries machinery and/or other equipment suitable for rapid manufacturing and deployment of the boom on site, for example carrying one or more reels of boom sleeve, and machinery such as motors, controllers, reel handlers, on-loading and off-loading devices, sensors, inflation modules and/or fluid-filling modules, and/or other equipment suitable for manufacturing and/or deploying the boom.

In some embodiments, at least one uninflated boom sleeve is provided (100). In some embodiments, the sleeve is divided into a plurality of segments, each of the segments comprising one or more pre-formed compartments. In some embodiments, one or more compartments are intended to function as floatation compartments, and one or more compartments are intended to function as ballast compartments. As referred to herein, a sleeve segment may include one or more compartments which, when coupled to one or more segments of one or more additional sleeves, define a boom unit, such that a plurality of boom units chained together form the boom. Alternatively, a segment of the first sleeve alone functions as a boom unit, comprising one or more floatation compartments and one or more ballast compartments. As also noted herein, a boom sleeve may use self-filling and/or prefilled sections and/or not have any inflatable sections.

In some embodiments, the boom sleeve comprises an elongated film, optionally multilayered, which is laterally closed. In an example, two elongated films are welded together at their edges, and further welded at one or more lengthwise and/or widthwise locations to define compartments. In some embodiments, the sleeve comprises a plurality of sealed areas of various shapes and sizes, separating between the inflatable compartments. In another example, a single film is folded over lengthwise to form the sleeve, and optionally welded at one more additional locations to define compartments.

In some embodiments, construction of the boom unit comprises interleaving a segment of the first sleeve with one or more segments of one or more other sleeves (102). Optionally, interleaving is performed before inflating and/or filling the compartments, during inflating and/or filling the compartments (i.e. before completion of the inflation), and/or following inflation and/or filling of the compartments. In some embodiments, interleaving comprises coupling a compartment or a portion of it by a threaded connection to one or more other compartments, for example by threading the first compartment or portion thereof through a designated opening of another compartment. In some embodiments, completion of inflation of the compartments locks the coupling between them, such that threaded compartments are prevented from disengaging each other. In some embodiments, the sleeve segment comprises one or more tabs, for example being sealed film areas, which are insertable into respective slots or openings of one or more additional sleeve segments to couple them together.

Additionally or alternatively, the compartments are coupled by other means, for example welded together (e.g. during factory manufacturing of the boom sleeve), glued together, attached by fixation means such as pins, clips, or bands, and/or other means suitable for maintaining the compartments attached.

In some embodiments, one or more connecting elements are used to couple between the interleaved compartments, for example a strap or band extended between the compartments. Optionally, the connecting element restricts relative movement of the compartments. Optionally, the connecting element acts as a baffle.

In some embodiments, at the site of deployment, compartments of the one or more boom sleeves are actively and/or passively inflated and/or filled (104). In other embodiments, for example, as described herein, one or more compartments (e.g., gas and/or water compartments) are pre-filled and/or are filled with an expanding material.

Optionally, pre-filling is during manufacture, before packaging (e.g., folding for storage).

In some embodiments, one or more compartments functioning as floatation compartments are inflated with a gas, such as air. Optionally, the compartments are actively inflated, for example by using an air blower. Additionally or alternatively, the compartments are passively inflated (or self inflated), for example by actuating a chemical and/or mechanical action which in turn produces a gas that fills up the compartment. In some embodiments, a chemical action is started by breaking a capsule or squeezing a bag to mix between two or more materials, for example producing a reaction between an acetic acid, citric acid or other weak acid, with sodium bicarbonate ($NaHCO_3$) or other salt or base to produce a volume of $CO_2$ which is sufficient for filling the floatation compartment. In an example, 10 cc of acetic acid and 16 cc of sodium bicarbonate, both in diluted aqueous solutions (25-50%), would produce a $CO_2$ volume of about 1-2 liters, for example being sufficient to fill a single compartment. In some embodiments, a chemical reaction for example as described may be used for filling a compartment of any size and/or shape, and the specific amounts of chemical reactors are selected to obtain a certain inflation pressure. In some embodiments, a liquefied gas such as $CO_2$ is released from a pressurized canister in the form of gas and fills up the compartment. It should be noted that filling need not include filling to tautness. Rather, in some embodiments, only sufficient gas for flotation need be provided and the walls of the compartment may not be stiffened significantly by the filling.

In some embodiments, activation of a chemical process for producing a volume of gas comprises application of heat. In some embodiments, activation of a chemical process comprises applying an electromagnetic field.

In some embodiments, one or more compartments functioning as ballast compartments, that are intended to be positioned under water for stabilizing the boom, are actively and/or passively filled with fluid, such as water. In some embodiments, a pump fills the compartment with water. Additionally or alternatively, the compartment is at least partially deployed in ambient water (e.g. into the sea, ocean) to be self-filled with water. Additionally or alternatively, the compartment contains an absorbing material, such as a sponge or SAP (super absorbent polymer), which absorbs water that thereby increases a weight of the compartment, allowing it to function as a ballast and/or stiffen for structural reasons and/or act as an anchor. As used herein the term SAP includes, inter alia, Sodium Polyacrilate, and/or other materials such as polyacrylamide copolymer that absorb water to form a gel or other complex with a volume of at least 5 times the original material volume.

Optionally, water is absorbed by the absorbing filler material during deployment of the boom in ambient water. Additionally or alternatively, a mechanical action is performed to cause the compartment to be self filled with water, for example a spring is released within the flattened compartment to extend the compartment and increase its volume, allowing it to be filled with water. In some embodiments, the amount of SAP in the cell can control the quantity of water absorbed. The amount of water in the cell may also be controlled by the flexibility of the walls of the compartment or other structure enclosing the SAP.

In some exemplary embodiments of the invention, these wall include pores and/or other structures suitable for ingress of water but which prevent the exit of SAP particles and/or of a SAP-water complex formed by absorption.

In some embodiments, one or more additional compartments are filled with fluid, such as water, and are positioned above ambient water level, for example as will be further shown. This may provide improved stability.

In some embodiments, inflation of the floatation and/or ballast compartments produces a boom unit in which sealed sleeve areas between the compartments provide flexibility to the structure. Optionally, the sealed areas function as axis that allow movement of the inflated compartments around them, for example allowing for bending of compartments relative to each other. In some embodiments, a material from which the sleeve film is made of is at least somewhat rigid, so that the extent of folding and/or otherwise flexing a sealed area is limited.

In some embodiments, the inflated and/or filled compartments provide rigidity to the boom unit. Optionally, inflation pressures (which may vary between compartments or even vary within sub-compartments of a single compartment) and/or mechanical pressures resulting from a filler material, such as SAP, being absorbed with water, are selected to provide rigidity for at least some portions of the boom unit. In some embodiments, the inflated and/or filled compartments act as beams which define a rigid frame for the boom unit. In some embodiments a compartment and/or another SAP enclosing structure includes at least one semi rigid walls (e.g., produced using a thermoplastic process) and/or using semi rigid elements such as beams, snaps, hinges etc. which are inserted into the cell structure. Such elements may increase rigidity.

In some embodiments, inflation pressures of the floatation compartments and/or of the ballast compartments are selected according to environmental conditions. For example, a pressure is selected according to an ambient atmospheric temperature and/or ambient water temperature in which the boom is deployed in. In some embodiments, fluctuations in water and/or ambient temperatures, for example over a day, are taken into consideration when selecting the inflation pressures. Optionally, the boom is automatically inflated and/or self inflated, for example as described herein, and inflation pressures are automatically selected by a controller in communication with inflation modules, such as inflation modules carried by the deployment craft, based on environmental conditions. Optionally, the environmental conditions are inserted by a user. Additionally or alternatively, the environmental conditions are automatically measured with the aid of one or more sensors, such as temperature sensors. Other environmental conditions which may be taken into consideration when selecting the boom parameters during manufacturing may include, for example, wave conditions (e.g. height, pattern, frequency), current conditions, and/or other weather conditions, a geographical location in which the boom is deployed (for example far off-shore seas or coastal areas), and/or other conditions.

In some embodiments, the produced boom is deployed around a spill such as an oil spill to contain the spill and limit its spread (106). A potential advantage of rapidly producing the boom on site may include containing the boom before it spreads over a larger area. By inflating and/or filling compartments that are already pre-formed in the reeled boom sleeve, and are not produced on site, on-site production time may be reduced, for example relative to a boom which is manufactured on site from rolled films or sheets.

In some embodiments, the produced boom does not contain any material that is heavier than water, or contains only an insignificant percentage of material heavier than water, such as 1%, 2%, 5% or intermediate, larger or smaller percentages of material heavier than water. A potential advantage of using a boom which is lightweight before as well as after production, the boom can be deployed immediately after detection of the spill, requiring only a small team (e.g. 2 people) to prepare and deploy the boom on site.

In some embodiments, a weight of about 1 meter of boom length, for example including three chained segments which alone or together with additional segments such as 2 segments form the three dimensional boom, ranges between, for example, 300-900 grams, such as 350 grams, 500 grams, 650 grams, 750 grams, or intermediate, larger or smaller ranges.

In some embodiments, the deployed boom remains unattached to external supporting structures, such as the deployment craft or an anchoring element, and allowed to flow freely. Optionally, the boom ring which is deployed around the spill is subjected to environmental conditions such as wind, water currents and/or waves in a similar manner the spill is subjected to those conditions, and the boom may drift along with the spill while still containing it. In some embodiments, the boom dimensions are small, for example smaller than boom dimensions known in the art. Optionally, the boom dimensions are small enough to allow free flow of the boom, such as flow along with the spill. A potential advantage of a boom unit comprising relatively small dimensions, for example as compared to known in the art booms (extending for example about 1 meter above water, and about 2 meters below) may include easier and/or faster deployment. Another potential advantage may include a boom which rapidly adjusts to surrounding conditions, and may be configured to immediately respond to sudden changes in conditions, such as a sudden blow of wind. Another potential advantage of a boom comprising relatively small dimensions may include facilitating storing and/or handling of a lengthy boom at the spill site, and/or pre-loading a plurality of booms on a small deployment craft As the boom size may facilitate handling and/or deploying, an exemplary length of a 30, 50, 100 meter boom or intermediate, longer or shorter lengths may by handled by a small team (e.g. 2-3 people) and may reduce the need for using heavy machinery such as a crane, forklift or other maneuvering machinery.

Figure 2A:
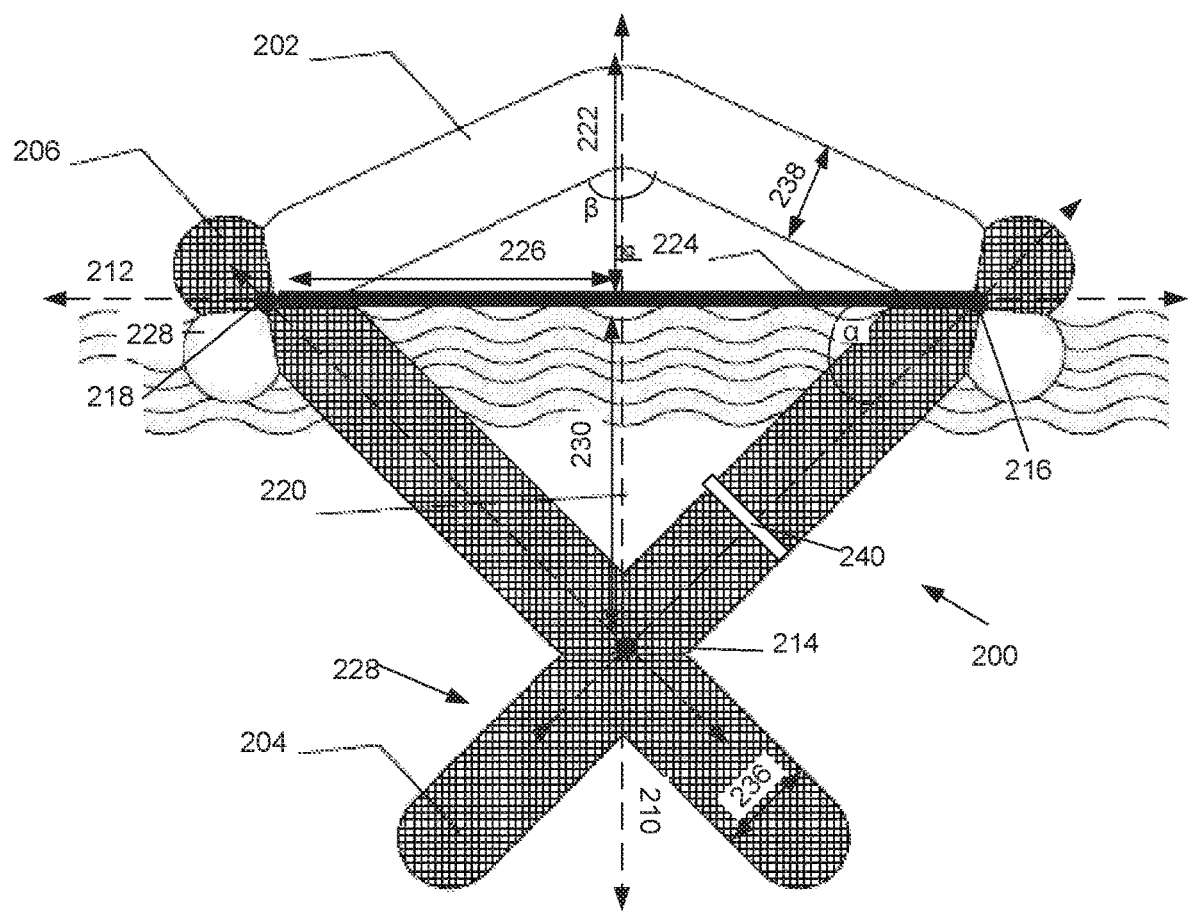
FIGS. 2A-B are a cross section view of a boom unit comprising a stabilizing geometry in the form of a closed triangular arrangement, and a schematic illustration of the external forces acting on the boom unit, according to some embodiments of the invention.
Figure 2B:
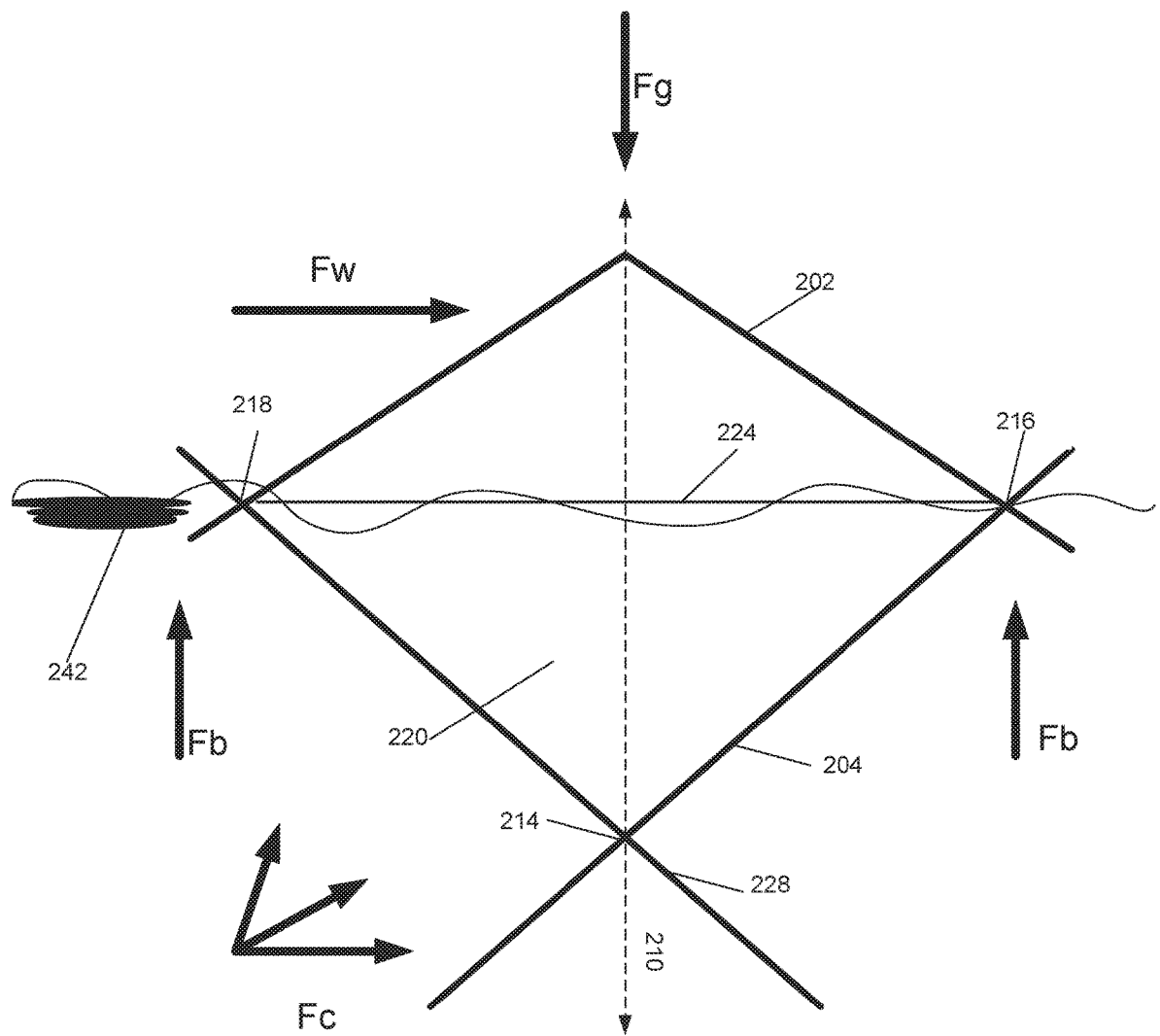

FIGS. 2A-2B are a cross section view of a boom unit comprising a stabilizing geometry in the form of a closed triangular arrangement, and a schematic illustration of the external forces acting on the boom unit, according to some embodiments of the invention.

In the exemplary structure shown in the figure, boom unit 200 comprises an above-water floatation compartment 202, optionally comprising a bend, and two under-water ballast compartments 204 containing water, each compartment comprising an extension 206 which is positioned above ambient water level. Floatation compartment 202 is configured proximally to ballast compartments 204, to be positioned mainly above water. In some embodiments, a connecting element such as element 224 in the form of a band or strap extends between two or more compartments and/or joints between compartments to restrain their relative movement. In this example, element 224 extends between the joints of flotation compartment 202 with water compartments 204.

Alternatively, in some embodiments, the boom unit comprises a different number of floatation compartments and/or a different number of ballast compartments, for example comprising two floatation compartments coupled to each other, optionally forming a bend.

In some embodiments, the boom unit comprises a hollow chamber, which at the cross section shown in this figure is represented by bordered area 220. In the example shown herein, the closed cross section profile of the hollow chamber is defined by three locking points, one locking point 214 being located at a crossing point between water compartments 204, and two locking points 216, 218 being located at the threaded connections between water compartments 204 and floatation compartment 202. As referred to herein, a locking point may include a crossing point between two or more connected compartments; a bend of a compartment; a threaded connection between two or more interleaved compartments; a glued and/or welded connection; and/or other geometrical junction which, along with one or more additional geometrical junctions, defines a framed structure. In some embodiments, the locking points set an angular position of the compartments relative to each other. In some embodiments, the locking points restrict movement of interleaved compartments relative to each other.

In some embodiments, locking points are arranged to define a closed shape in the form of an equiangular, optionally equilateral polygon. In this figure, the closed shape is in the form of an equilateral triangle, with an angle α of 60 degrees between the axes extending between the locking points. A potential advantage of an equilateral configuration may include effectively containing the spilled material in between the legs of the triangle, defined for example by ballast compartments 204. Optionally, ballast compartment 204 extends diagonally to form a hypotenuse in a triangle in which long axis 210 of the cross section forms one edge of the triangle, and horizontal axis 212 (extending substantially across the water surface) forms the second edge.

Alternatively, the locking points may define a quadrilateral configuration, a hexagonal configuration, and/or other polygonal configuration. In some embodiments, the closed shape comprises a rounded configuration, such as a circle. A potential advantage of a boom unit structure comprising at least one closed shape may include increasing resistance of the boom unit to forces which may cause the boom unit to tip over, flip and/or rotate, such as forces resulting from wind, water currents and/or waves. By positioning the compartments according to the locking points to define walls of the bordered area 220, the boom unit may be provided with increased stability relative to an "open" arrangement of compartments, such as a "W" shaped configuration of compartments.

In some exemplary embodiments of the invention, the shape used for the skirt is selected to prevent fluid escaping below the skirt to the other side of the skirt.

Optionally, this is includes shapes with outwardly pointing sections (e.g., sharp angles relative to the vertical) at the lower end of the skirt, which prevent gradual movement of fluid. Optionally, such sections are provided on both sides of the skirt.

Alternatively, only one side is so provided.

Optionally, at any given moment the compartments bordering the closed area 220 at least partially interfere with natural flow of ambient water within the limits of bordered area 220 and/or surrounding area 220. A potential advantage of a boom unit defining a bordered area such as area 220 between the compartments may include stabilizing the boom unit and maintaining it an upright position in which it effective to limit spread of the spill without the need of using an external weight or ballast such as a metal chain and/or other type of anchor which is heavier than water. In some embodiments, a cross sectional size of bordered area 220 is effective to "trap" a sufficient amount of ambient water to obtain a stabilizing effect, in which the longitudinal axis of the boom unit is substantially perpendicular to the water surface to prevent oil from passing through.

In some embodiments, axial flow through bordered area 220 (i.e. flow in a substantially perpendicular direction to longitudinal axis 210 of the boom unit) continues to flow through. In some embodiments, the closed shape is formed with one or more openings, such as opening 240 defined within compartment 204, which allow water to flow through.

In some embodiments, the closed shape is symmetrically arranged relative to the longitudinal axis 210 and/or relative to the horizontal axis 212 of the boom unit.

Alternatively, in some embodiments, the closed shape is arranged in an asymmetrical configuration relative to the axis, for example having a first locking point positioned at a greater distance from axis 210 than an opposing locking point.

Another potential advantage of a boom unit comprising a closed shape may include increasing a rigidity of the boom unit without increasing an amount of material from which to boom is formed (e.g. without increasing a thickness of the film) and/or without the need for external rigid elements, such as a metal cable.

In some embodiments, floatation compartment 202, comprising for example one bent compartment or, in some embodiments, two compartments arranged at an angle relative to each other, extend sideways relative to longitudinal axis 210. Optionally, for example as shown herein, axis 210 passes through a center of gravity of the boom unit (at the location of locking point 214), and by extending away from axis 210 floatation compartment 202 is effective to balance the boom relative to axis 210, maintaining longitudinal axis 210 at a substantially perpendicular position relative to the surface of the ambient water. A potential advantage of floatation compartment 202 may include stabilizing a position of the ballast compartments of the boom unit, such as water compartments 204, relative to the water surface. It is noted by the inventors that if the boom unit was comprised of water-filled ballast compartments only, without any floatation compartments or other floatation elements, the water-filled ballast compartments would be moved by the ambient water in a similar way to a water filled bag, and would drift along with the ambient water, instead of having the long axis of the boom in a substantially perpendicular position relative to the water surface, a position in which the boom unit is effective to limit spread of the spill, according to some embodiments.

In some embodiments, a distance 226 between an extended tip 228 of floatation compartment 202 and longitudinal axis 210 is selected to be short enough to withstand forces such as waves and/or winds without breaking. In some embodiments, distance 226 is selected to be long enough so as to utilize more buoyancy forces acting towards the water surface, for stabilizing the boom unit. In some embodiments, distance 226 ranges between, for example, 10 cm to 30 cm, such as 12.5 cm, 20 cm, 25 cm or intermediate, longer or shorter distances. Optionally, a thickness of the film material from which the extensions are formed of is selected be thick enough to reduce breakage.

In some embodiments, tips 228 of floatation compartment 202 are located within the ambient water, for example at a distance ranging between 1-10 cm, such as 1.5 cm, 5 cm, 7 cm, or intermediate, longer or shorter distances from the water surface. A potential advantage of having tips 228 positioned within the ambient water may include reducing a risk of wind lifting the boom from the water.

In some embodiments, a maximal height 222 between floatation compartment(s) 202 and horizontal axis 212, which in this example extends substantially along the surface of the water, is selected, on one hand, to be high enough to prevent the spilled material from being sprayed (e.g. due to wind) over the boom unit, and on the other hand to be low enough to reduce the effect of drag forces (such as drag caused by wind).

Optionally, height 222 ranges between, for example, 7-40 cm, such as 10 cm, 20 cm, 25 cm, or intermediate, longer or shorter heights.

In some embodiments, an angle β is defined at a joint between two floatation compartments and/or at a bend of a single floatation compartment 202. Optionally, angle β ranges between, for example, 60-150 degrees, such as 70 degrees, 95 degrees, 120 degrees or intermediate, larger or smaller angles. In some embodiments, inflation pressures of floatation compartment(s) 202 are selected to produce a certain angle β.

Optionally, in a single floatation compartment comprising a bend, increased inflation pressure would produce a sharper, smaller angle β. In some embodiments, the bending angle of a compartment is set by the shape and/or size of sealed sleeve areas surrounding the bend.

In some embodiments, a degree in which interleaved compartments are locked to each other is determined by inflation pressures. Optionally, reduced inflation pressure enables at least some degree of freedom between the coupled compartments, allowing for their relative movement, for example allowing a compartment to bend and/or rotate and/or slightly slide axially relative to another compartment.

In some embodiments, ballast compartments of the boom unit such as water containing compartments 204 define an upside-down V configuration 228. A potential advantage of an upside-down V configuration may include increasing a resistance of the boom unit to being pulled out of the water, for example due to wind acting on the floatation compartments and/or due to water currents. In some embodiments, an angle defined at a crossing between compartments 204, such as at locking point 214, is a substantially perpendicular angle, for example ranging between 85-95 degrees. In an embodiment, the angle is a 90 degree angle.

In some embodiments, a length of 230 of the ballast, under water portion of the boom unit, as measured for example along axis 210 between horizontal axis 212 and a distal end of ballast compartments 204, is selected to be long enough to reduce a risk of the boom unit being pulled out of the water and/or to block the spilled material from passing underneath (i.e. distally) to the boom (entrainment phenomena) and on the other hand short enough to be less subjected to forces which may cause the boom to bend (e.g.

with respect to the longitudinal axis), risking passing of the spilled material beyond the boom at the bend. Optionally, length 230 ranges between, for example, 30-70 cm, such as 35 cm, 50 cm, 65 cm, or intermediate, longer or shorter lengths. Optionally, by increasing a rigidity of ballast compartments, such as by using a more rigid film material which forms the compartment walls and/or by increasing a thickness of the compartment walls, a longer ballast portion can be used since a more rigid ballast will better resist bending forces. In some embodiments, a trade off is made when selecting dimensions and/or type of materials used for the underwater ballast portion of the boom, since a longer, more rigid ballast portion would on one hand more effectively resist external forces (such as wind and/or currents) and increase the stability of the boom, and on the other hand would take up a larger volume when in a non-deployed, reeled state, and may take a longer time to deploy.

FIG. 2B is a schematic illustration of forces acting on boom unit 200, according to some embodiments of the invention.

In the example shown herein, buoyancy Fb up-thrusts the boom unit, coinciding with the opposite gravitational force Fg. Boom unit 200 is balanced at least partially above water surface (floatation compartment 202), and at least partially below water surface (ballast compartments 204), in a position which is effective to block oil spill 242 from spreading further on the water surface. In some embodiments, oil spill 242 is contained between two levels along longitudinal axis 210: a first level approximately at the water surface, at the level of an interleaving between ballast compartments 204 and floatation compartments 202 (such as in between locking points 216 and 218), and a second level at crossing point 214 of ballast compartments 204.

In some embodiments, forces caused by wind, such as Fw, act on the above water portion of the boom in one or more directions, any may cause the boom to tilt sideways, flip, and/or be lifted above the water. In some embodiments, forces caused by underwater currents, Fc, act on the below water portion of the boom in one or more directions, and may cause the boom to rotate, tilt, and/or be pushed higher above water.

In some embodiments, the boom structure is configured to increase resistance of the boom unit to at least some of the above mentioned forces. When referring to the configuration of flotation compartments 202, for example, the sideways extending of the compartments resists uplifting forces and balances longitudinal axis 210 in substantially perpendicular position to the water surface; when referring to the closed shape defined by ballast compartments 204 and connecting element 224, for example, the closed shape acts as a weight against winds acting on floatation compartments 202, resisting tilting and/or uplifting of the boom unit by wind; when referring to the upside-down V shape 228 defined by the distal portions of ballast compartments 204, for example, the upside down V shape acts an anchor, resisting uplifting currents and/or uplifting winds.

In some embodiments, the boom unit is configured for immediately responding to waves, for example to a change in wave height and/or pattern, remaining in a position in which it aligns the margins of the spill even when the spill (and boom) are moved by a wave. In some embodiments, if the buoyancy forces Fb counteract the gravitational force Fg such that the boom is balanced on the water surface, the boom will rise and fall with the wave at a minimal delay. As the spill floats on the water surface which moves along with the wave, the boom will "adhere" to the spill that is being moved by the wave, and be moved by the wave in a similar manner to the spill, reducing the risk of spilled material escaping below and/or above the boom.

In some embodiments, a length of a boom segment, extending substantially in parallel to the water surface, which defines (on its own or by being coupled to one or more segments) one or more "vertical" (e.g. substantially perpendicular to the water surface) boom units, is selected to be short enough to comply with a curvature of a wave.

A potential advantage of a boom comprising a plurality of chained boom segments coupled to each other by a flexible connection which allows for at least some relative movement between the segments, wherein each segment is short enough to comply with a curvature of a wave, may include reducing a risk of the spilled material passing above and/or below the boom, as due to the relatively short length of the segment the segment will remain as close as possible to the curved water surface.

Figure 2E:
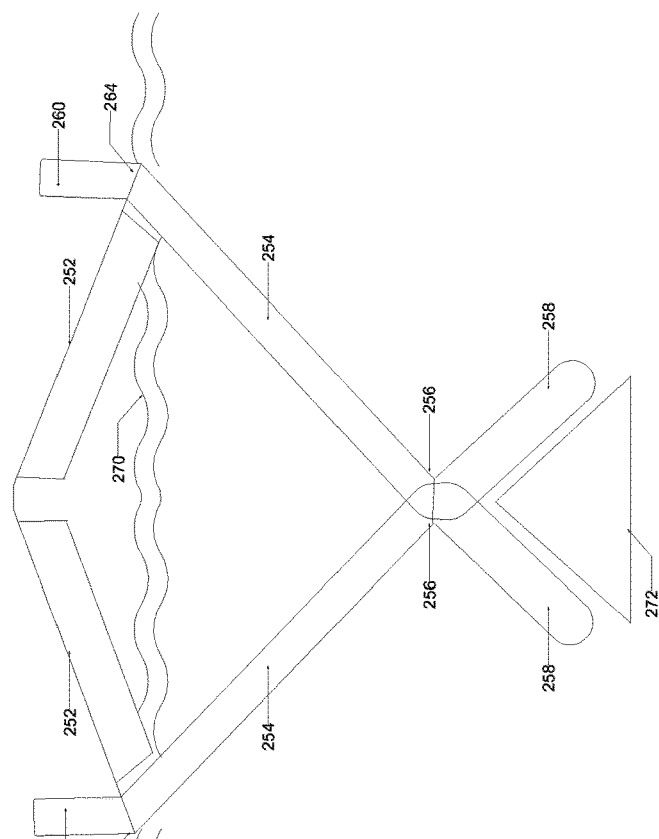
FIG. 2C-2E show a folding of a boom section having optional above water water-holding compartments, according to some embodiments of the invention.
Figure 2D:
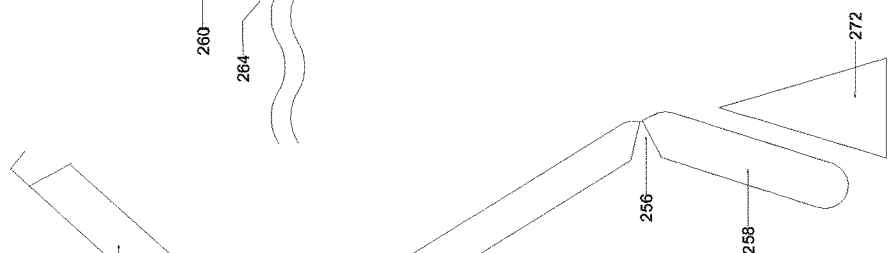
Figure 2C:
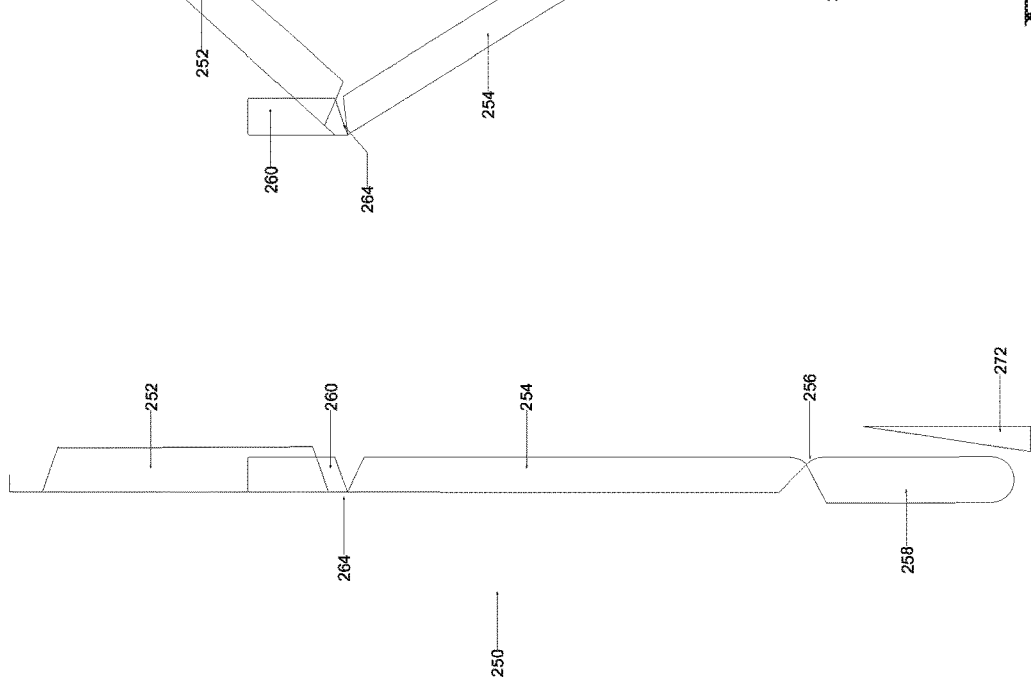

FIG. 2C-2E show a folding of a boom section having optional above water water-holding compartments, according to some embodiments of the invention.

While a boom can be based on interlocking of fillable segments, in some embodiments, the segments are welded together and/or include fold lines.

FIG. 2C shows half (left side) of a cross-sectional view of a boom section 250. A top segment 252 is used for floatation and may be, for example, fillable with gas or prefilled, for example including one or more sealed compartments with gas therein. A top hinge 262 interconnects top segment 252 with a right side top segment (See FIG. 2E, for the deployed segment).

A water filled ballast segment 254 is attached by a hinge 264 to segment 252.

Optionally, hinge 264 is a living hinge formed of a single layer of the material of the housing of the segments and/or two such layers, optionally welded together.

Optionally, hinge 264 is seized so that when section 250 is deployed, segment 252 will lean against segment 254 (FIG. 2E).

An optional above water water-filled segment 260 is optionally provided as well, for example as described herein, and may also be attached to hinge 264.

Optionally, two segments 254 meet at a connection/hinge 256 (FIG. 2E) (e.g., in those embodiments where a hollow chamber is formed between the segments).

Optionally, the two segments are pre-attached, for example, by welding, adhesive and/or a connector.

A lowest, skirt segment 258 is optionally provided, attached to hinge 256 and may provide for balancing. It is noted that in some embodiments of the invention segment 258 on the left of the device is an extension of segment 254 on the right, and vice versa. In the shown embodiment, this may also be the case. Optionally however, segment 258 of the left side is contiguous with (e.g., formed of a contiguous sheet) with segment 254 of the left side.

Segments 260, 254 and 258 optionally include SAP or other absorbing material and include one or more apertures to allow inflow of water to be absorbed by the SAP.

This absorbing may cause deformation and/or filling of the segments. In some embodiments, segments 252 also include SAP.

FIG. 2D shows section 250 during folding and FIG. 2E shows section 250 (left and right sides) in a deployed state and also illustrating a water line 270.

In some embodiments of the invention, the films used for constructing section 250 are semi-rigid, for example, thermoformed plastic films (150-450 microns thickness), which are manufactured to provide an X-shaped boom, as shown. As noted, segments 252 are optionally prefilled with air or with sealed air units (such as 2D arrays of bubbles or individual formed plastic films such as PET, PP, HDPE etc. bubbles) and sealed (if needed). Segments 260, 254, 258 are optionally prefilled with sap and include one or more apertures or have a porous wall material. In some embodiments of the invention, the section is stored flat and deployment may be assisted by an external wedge 272 (e.g., on which sections 258 and their hinge 256 ride while being deployed) (or a wedge on which sections 252 and their hinge 262 ride) which gradually unfolds the boom. Optionally, as the boom unit progresses, the shape of the wedge changes gradually from a flat plate to a triangle (e.g., increasing the apical angle), forcing the angle between the two 258 section to increase, for example, to be close to 90 degrees.

Optionally, the boom shape is maintained, at least in part, using a plastic or metal mechanism which prevents reversing the process (e.g., FIGS. 2F-2G),In some embodiments of the invention, the width of a deployed section is between 100 and 300 mm, for example, between 240 and 280 mm. Optionally, the height above hinge 264 is between 10 and 60 mm, for example, between 30 and 45 mm. Optionally, the height below hinge 264 is between 150 and 300 mm, for example, between 180 and 230 mm.

Optionally, the width at the lowest part of the boom is between 20 and 100 mm, for example, between 35 and 75 mm. Optionally, the thickness of the sections is between 10 and 40 mm, once filled.

In some embodiments of the invention, folding is provided by expansion of segments 254, 258 and/or by providing a tensile element (not shown), optionally elastic, for example, between 262 and 256. Optionally, where a non-elastic tensile member is provided, segment 254 is provided folded. When it expands, it unfolds and therefore causes a deformation of section 250 as a whole, as the tensile element is stretched by the unfolding.

In some embodiments of the invention, one or more segments includes an insert (e.g., of a shape memory or elastic material), optionally within the segment, rather than attached to an outside surface thereof, optionally bridging a hinge area, which is disposed to bend to a desired shape.

In some embodiments of the invention, shape memory material is provided between two segments, for example, to push them apart or bring them together, for deployment.

Figure 2H:
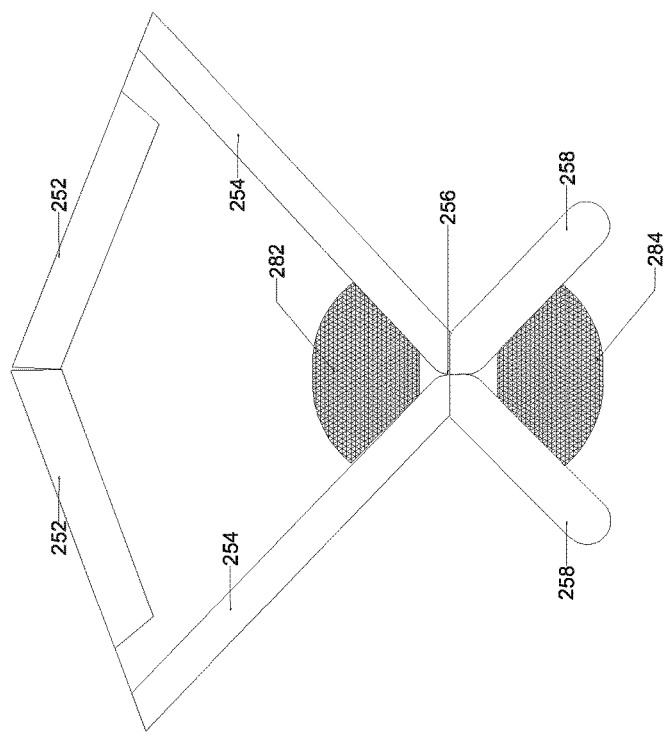
FIG. 2F-2H show an exemplary folding of a boom section using a shape-memory material or other elastic mechanism, according to some embodiments of the invention.
Figure 2G:
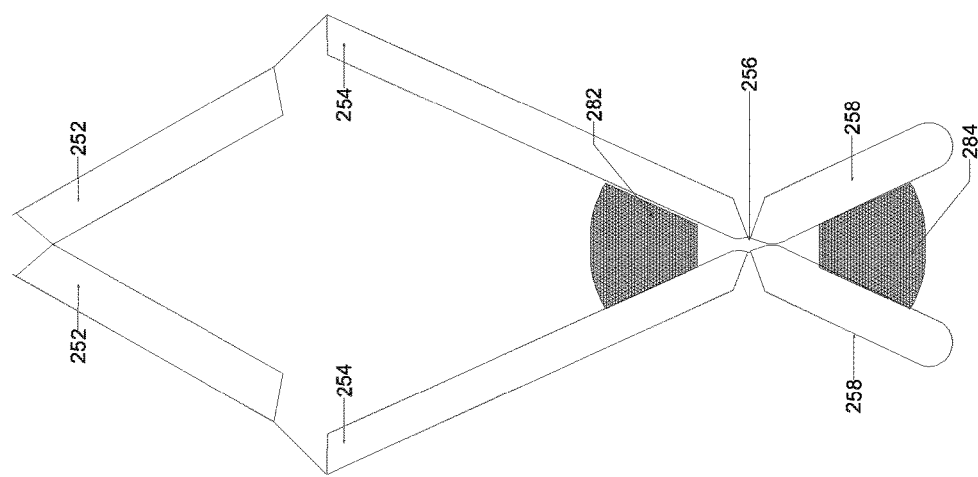
Figure 2F:
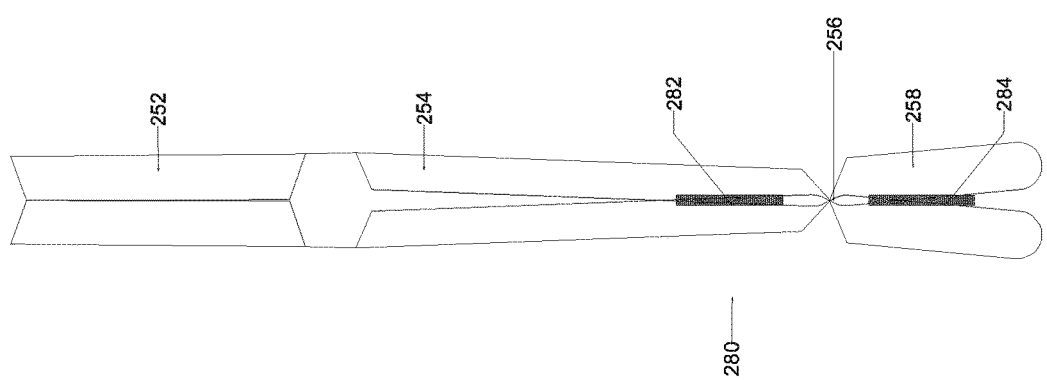

FIG. 2F-2H show an exemplary folding of a boom section 280 using a shape-memory material or other elastic mechanism (in general, "energy storage"), according to some embodiments of the invention. As shown, in a boom section having (optionally) a similar design to that of section 250, shape memory material 282 and/or 284 are provided between sections 254 and 254 and/or between sections 258 and 258. As can be seen from the progression of 2F-H, return of this material to a resting state thereof, causes an angle between the sections to increase, causing, assisting and/or guiding the folding of section 280.

In some exemplary embodiments of the invention, material 282 and/or 284 are replaced by a mechanism, for example, a spring (e.g., metal or plastic) with a ratchet and/or only a ratchet and/or only a spring, which assist in deployment and/or prevent refolding.

Figure 3:
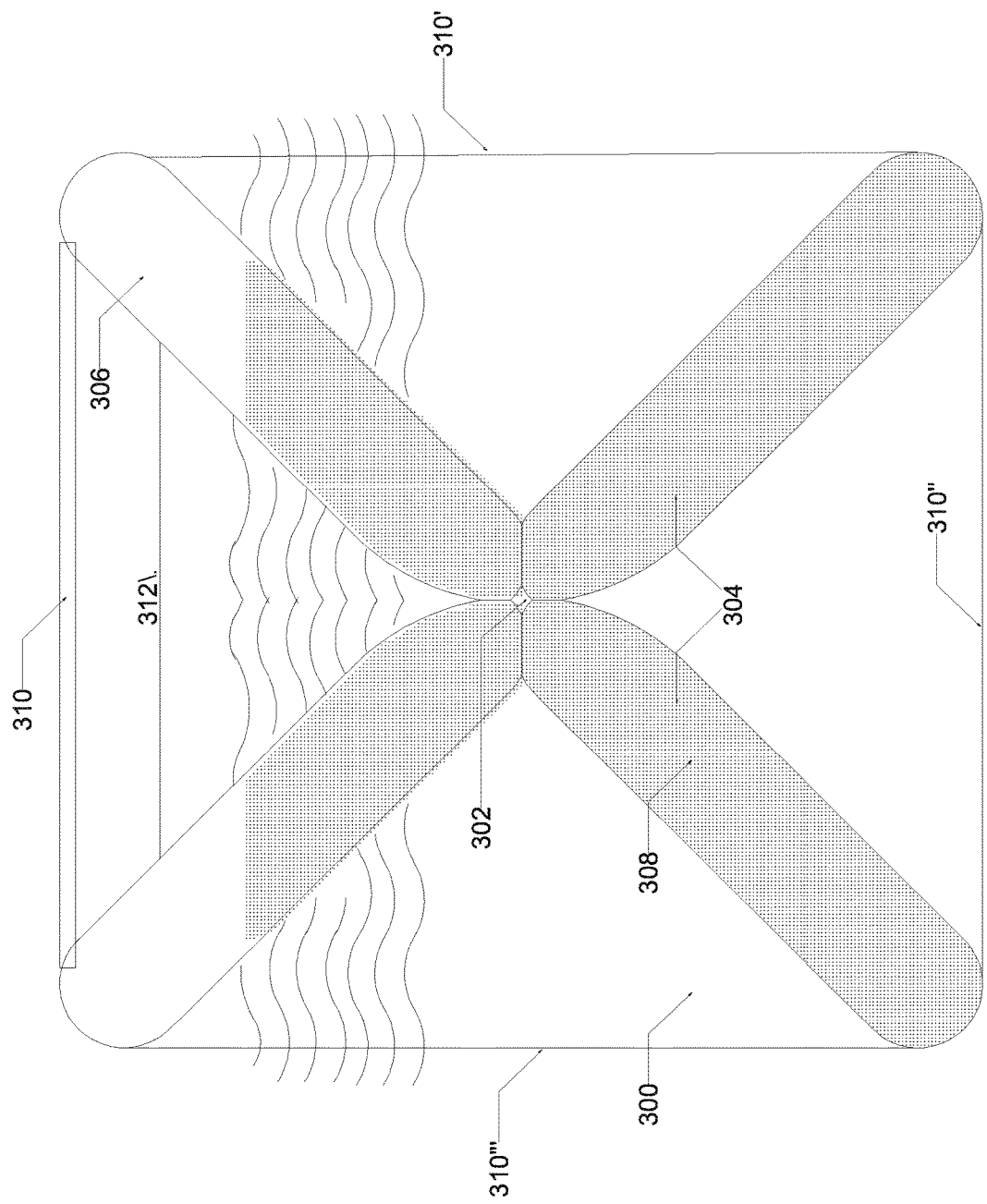
FIG. 3 is a cross section view of a multidirectional X-shaped boom unit which is functional even when tipped over, according to some embodiments of the invention.

FIG. 3 is a cross section view of a multidirectional X-shaped boom unit, according to some embodiments of the invention.

In some embodiments, boom unit 300 comprises a multidirectional configuration, in which the boom unit is effective to limit spread of the spill even when rotated with respect to a central axis of the boom (e.g. an axis extending along a plurality of chained boom units) passing through center 302 of the boom unit.

In the example shown herein, boom unit 300 comprises an X structure, comprising two interleaved compartments 304 (alternatively, an X structure can be obtained by interleaving a different number of compartments, for example 4 compartments. Alternatively, a single X shaped compartment is used).

In some embodiments, a compartment 304 contains both gas 306, such as air, and water 308. Optionally, since the gas is lighter than the water, it would float in a proximal direction regardless of the current orientation of the boom relative to the central axis, thereby functioning as a floatation element and being elevated above water level.

In some embodiments, a ratio between the volume of gas (e.g. air) and the volume of water that are contained within compartment 304 is selected to obtain a certain depth of the ballast portion which contains the water (e.g. a depth relative to the water surface), stabilized by a selected extent of floatation (e.g. a distance between a floating tip of the X structure, and the water surface).

In some embodiments, a connecting element 310 connects between two or more compartments or portions thereof. Optionally, in this exemplary X configuration, additional connecting elements, for example, one or more of connecting elements 310', 310", 310''' are also provided to connect between pairs of segments of the X configuration. As can be appreciated, the connection may be on all sides, or on only some of the sides, for example, the two lateral sides and/or the top and/or bottom. Optionally or alternatively, to the connecting element being near an edge of the compartment, a connecting element, for example, 312, may be provided instead, or in addition, closer to the center of the boom, for example, within 70%, 50%, 30 or intermediate percentages of the distance between the compartment edge and the geometric center of the cross-section of the boom. The deployment process may include memory shape material or a wedge as described in FIGS. 2C-2E.

In some embodiments of the invention, connecting elements 310 (and/or 312) prevent collapse of boom unit 300 and can be arranged vertically and/or horizontally (e.g., similarly in other boom designs). In some embodiments of the invention, the connecting elements are in the form of ribbons or rigid or semi-rigid beams, found at spaced apart locations along the boom unit. For example, such a ribbon may be formed of the same film used for the shell of the boom unit and have a width of, for example, between 1 and 15 cm, and be spaced apart, for example, with spacing of between 5 and 50 cm between adjacent connecting elements.

Figure 4:
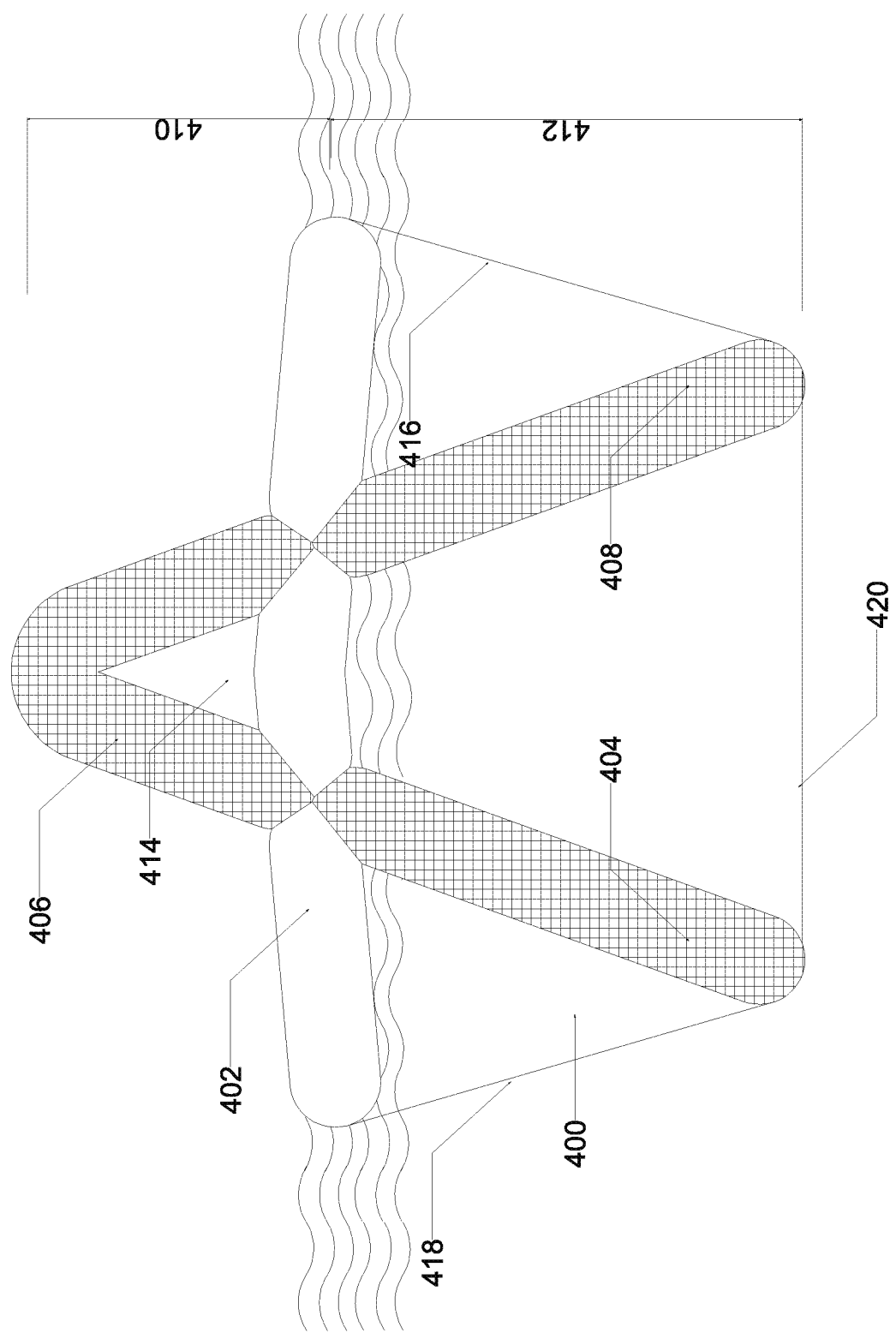
FIG. 4 is a cross section view of an A-shaped boom unit, according to some embodiments of the invention.

FIG. 4 is a cross section view of an A-shaped boom unit, according to some embodiments of the invention.

In some embodiments, a geometry of boom unit 400 comprises one or more closed shapes, for example configured above water. In the example shown herein, one or more flotation compartments 402 and one or more ballast compartments 404 are arranged to form an A shaped profile, defining a closed triangular shape on an above water portion of the boom unit.

In some embodiments, ballast compartment 404 is interleaved with floatation compartment 402 in a configuration (e.g. a threaded connection) that forces the ballast compartment to bend into an A shape, having a portion 406 of ballast compartment 404 positioned proximally to floatation compartment 402 (and thereby above water surface when deployed), and a portion 408 positioned distally to floatation compartment 402 (and thereby under water surface when deployed).

In some embodiments, the above-water portion 406 of ballast compartment 404 comprises a weight sufficient for weighing down the boom structure, reducing a risk of the boom being lifted, tilted, rotated, and/or otherwise destabilized. Optionally, above water portion 406 extends to a height 410 (i.e. relative to the water surface) which is suitable blocking spilled material from passing between above water portion 406 and floatation compartment 402 and/or for blocking spilled material from being sprayed over the top of the above water portion.

In some embodiments, a closed triangular area 414 is defined between above water portion 406 of the ballast compartment, which form the legs of the triangle, and flotation compartment 402, which forms the base of the triangle. Alternatively, in some embodiments, the closed area comprises a different shape, such as a rounded shape.

In some embodiments, the below-water portion 408 of ballast compartment 404 is shaped, in a similar manner to the upside down V configuration described hereinabove, to increase resistance of the boom from being lifted out of the water. Optionally, below water portion 408 extends distally to a length 412 suitable for reducing entrainment.

Optionally, one or more stiffening elements are provided, for example, flexible tension elements and/or rigid elements, for example, wires, ribbons or rods. These elements may be similar to elements 310-312 in FIG. 3. Optionally, for example, as shown, a connector 418 and/or 416 are provided between the skirt and the float and/or a connector 420 is provided between part of the skirt. The deployment process may include memory shape material or wedge as described in FIGS. 2C-2E.

FIGS. 5A-5D are various boom unit configurations comprising geometry including at least one closed shape, according to some embodiments of the invention.

Figure 5A:
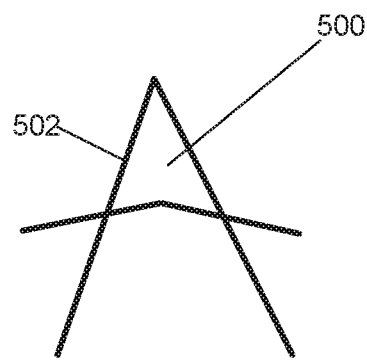
FIGS. 5A-D show various boom unit configurations comprising geometry including at least one closed shape, according to some embodiments of the invention.
Figure 5B:
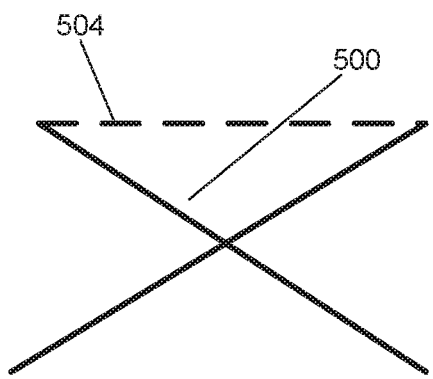
Figure 5C:
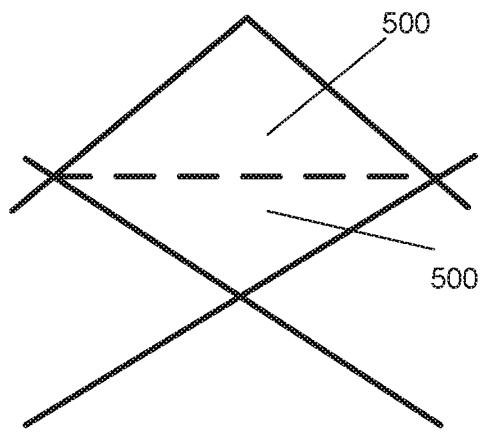
Figure 5D:
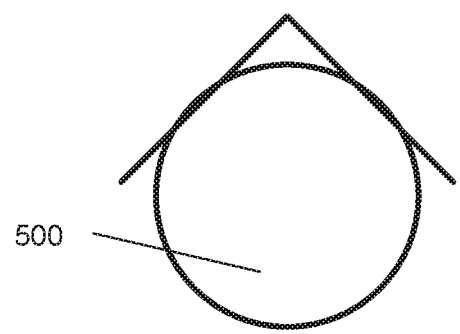

In some embodiments, for example as shown in FIGS. 5A-5C, the closed shape 500 is configured on a proximal portion of the boom unit, to be positioned above water when the boom is deployed. Additionally or alternatively, for example as shown in FIGS. 5C and 5D, the closed shape is configured on a distal portion of the boom unit, to be positioned below water when the boom is deployed. FIG. 5C illustrates a configuration in which a first closed shape is configured above water, and a second closed shape is configured below water.

In some embodiments, for example as shown in FIGS. 5A, 5D, the closed shape is bordered by the one or more compartments 502 of the boom unit. Additionally or alternatively, for example as shown in FIGS. 5B, 5C, the closed shape is bordered by one or more compartments and/or by one or more connecting elements between the compartments, such as a strap 504.

In some embodiments, for example as shown in FIGS. 5A, 5B and 5C, the closed shape 500 comprises a polygonal configuration, such as a triangular configuration. Alternatively, some embodiments may comprise closed shapes of other polygonal configurations, such as a trapeze, and/or other closed shapes. In some embodiments, for example as shown in FIG. 5D, the closed shape comprises a circular configuration, such as a circle or an ellipsoid.

Figure 6:
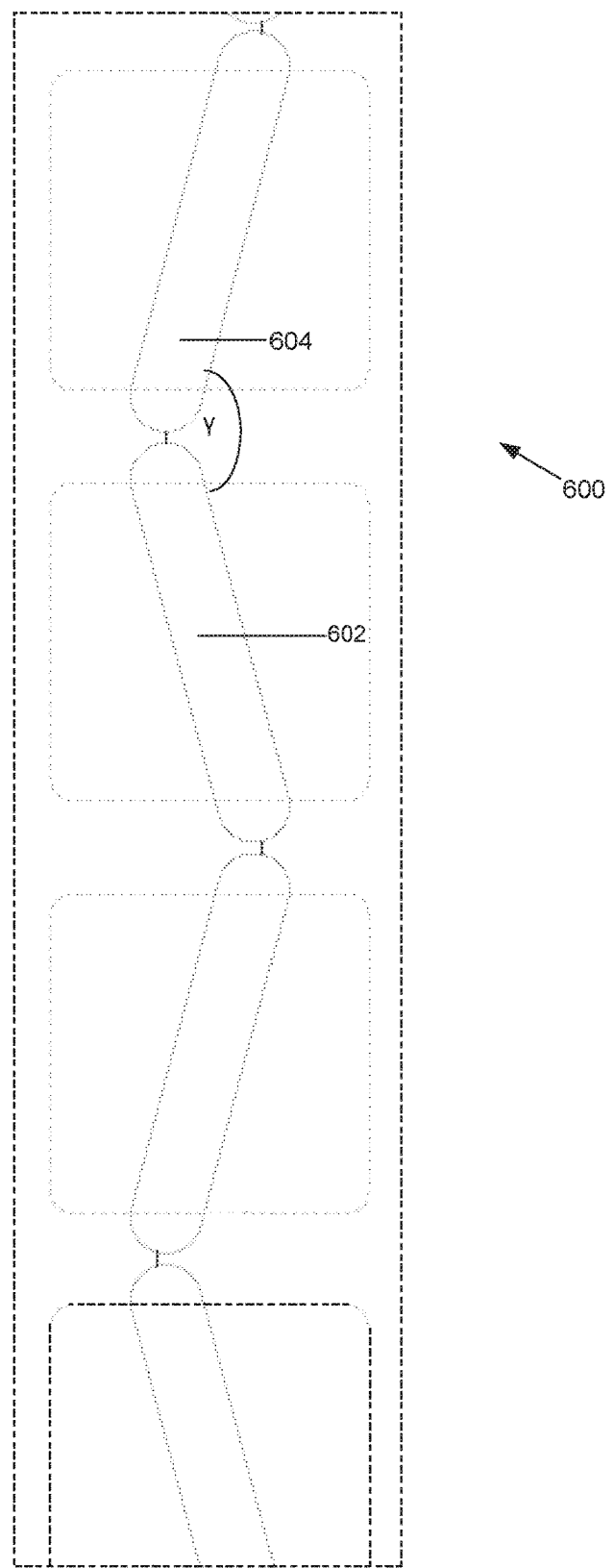
FIG. 6 is a top view of an exemplary ballast portion of a boom comprising a zigzag configuration, according to some embodiments of the invention.

FIG. 6 is a top view of an exemplary ballast portion of a boom comprising a zigzag configuration, according to some embodiments of the invention.

In some embodiments, chained ballast portions of a plurality of boom units which together form an underwater curtain 600 for preventing the passing of oil through, are arranged in a zigzag configuration for example as shown herein, in which a ballast portion of a single boom unit 602 is positioned at an angle y to a ballast portion 604 of a neighboring boom unit. Optionally, angle γ ranges between, for example, 90-170 degrees, such as 100 degrees, 120 degrees, 150 degrees, or intermediate, larger or smaller angles. Optionally, the angle is selected based on material properties of the sleeve's film. In some embodiments, a smaller angle y may provide increased resistance to side forces acting on the ballast compartments.

Optionally, producing and/or maintaining a smaller angle y may involve using sleeve material of increased rigidity and/or using fixation elements (e.g. straps, clips) which will maintain this alignment.

A potential advantage of the ballast portions forming a zigzag configuration when deployed in water may include increasing support in the floatation portions, contributing to the maintenance of a substantially perpendicular alignment between to floatation portions and ballast portions of the boom (and thereby of the ballast portions relative to the water surface).

In some embodiments, the angular alignment between two neighboring compartments is insignificant in size relative to the substantially curved outline of an oil spill, so that the blocking capabilities of the boom are not affected by the zigzag configuration.

Figure 7:
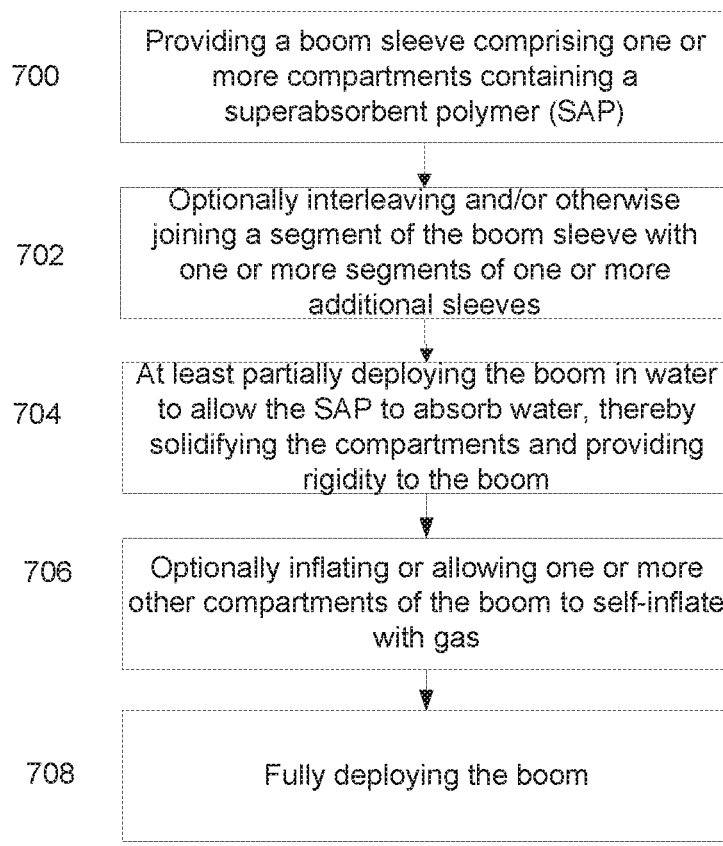
FIG. 7 is a flowchart of a method of preparing and deploying a boom containing a superabsorbent polymer, according to some embodiments of the invention.

FIG. 7 is a flowchart of a method of preparing and deploying a boom containing a superabsorbent polymer, according to some embodiments of the invention.

In some embodiments, a boom sleeve comprising one or more compartments containing a superabsorbent polymer (SAP) and/or sponge and/or foam and/or other material suitable for absorbing large quantities of liquid such as water, for example suitable for absorbing at least 10, 50, 100, 500 times or intermediate, larger or smaller amounts times the weight of the non-absorbed material, is provided (700). In an example, 1 gram of SAP is configured to absorb 20-60 grams of water. In some embodiments, the pre-absorbed SAP is in the form of powder, woven fibers, and/or unwoven fibers. In some embodiments, the SAP is contained inside the sleeve film forming the walls of the compartment. Optionally, the sleeve film protects the SAP from undesired exposure to humidity and/or from early exposure to water during deployment.

Optionally, an amount of SAP within a compartment is selected to be as lightweight and as low in volume as possible, yet sufficient for functioning, at least in some compartments of the boom or portions thereof, as ballast when absorbed.

Additional possible SAP configurations are described herein, for example, with respect to FIGS. 15A-16B.

In some embodiments, the compartment is perforated to allow water to be absorbed by the filler material. Additionally or alternatively, the compartment comprises one more valves, optionally one-way valves, which enable water to flow in. Additionally or alternatively, the compartment is coated by a water permeable membrane, for example comprising polymeric materials. Optionally, the membrane is not permeable to larger molecules or materials, such as SAP (e.g., 300 microns or less). Optionally, the membrane does not significantly impede passage of water and no significant pressure differential is needed for water to cross the membrane.

In some embodiments, a segment of the boom sleeve is interleaved and/or otherwise joined (such as by a welded coupling, glue, fixation means and/or other means suitable for attaching the segments together) with one or more segments of one or more other sleeves (702), for example as described hereinabove. Optionally, a segment comprising one or more floatation compartments, such as gas-inflatable compartments, is interleaved with a segment comprising one or more ballast compartments, such as compartments containing SAP. Alternatively, all compartments intended to form a boom unit contain SAP (or other absorbent material thereof), and no gas-inflatable compartments are used.

In some embodiments, the produced boom is at least partially deployed in ambient water, allowing the SAP to absorb water (704). Optionally, only the SAP containing portions are submerged in water prior to the rest of the boom. As fluid accumulates within the welded compartment, the SAP solidifies, hardening the compartment. Optionally, following absorption, a rigidity of the compartment increases relative to the rigidity of the pre-absorbed compartment, potentially increasing the mechanical strength of the boom. In some cases, the increased rigidity is obtained by selecting an amount of SAP which when fully absorbed is due to increase in volume to a volume larger than that of the welded compartment, so that the absorbed SAP applies pressure on the internal walls of the compartment. Optionally, the absorbed volume of the SAP (or other absorbent material) is at least 2%, at least 5%, at least 7% or intermediate, larger or smaller percentages larger than a volume of the compartment.

In some embodiments, if the boom unit comprises gas-inflatable floatation compartments, the compartments are actively inflated (e.g. by using a blower) and/or self-inflated (e.g. by actuating a chemical reaction) (706). Optionally, inflation is performed only after the SAP- filled compartments have been at least partially exposed to water, to ensure that during deployment the inflated compartments do no slow down the exposure of the SAP-filled compartments to the water.

In some embodiments of the invention, the gas-filled sections are pre-inflated and/or sealed during manufacture (e.g., stored inflated) and comprise, for example, one or more plastic-sealed gas bubbles and/or are sealed to act as gas-bubbles themselves.

Optionally, the boom unit is stored in a packaging in a folded state with the bubbles full of gas. Optionally or alternatively, a compartment includes between 1 and 1000 gas bubbles, for example, between 2 and 40, for example, between 2 and 10;

However, larger numbers may be used, for example, if the bubbles are small and/or compartment large.

In (708), the prepared boom is fully deployed in the water. Optionally, full deployment is performed only after a mechanical (e.g. a memory shape or a spring expanding the compartment) and/or chemical process (e.g. breaking of a capsule to activate a chemical reaction) for inflating the floatation compartments and/or the water absorbable compartments has taken place.

Figure 8:
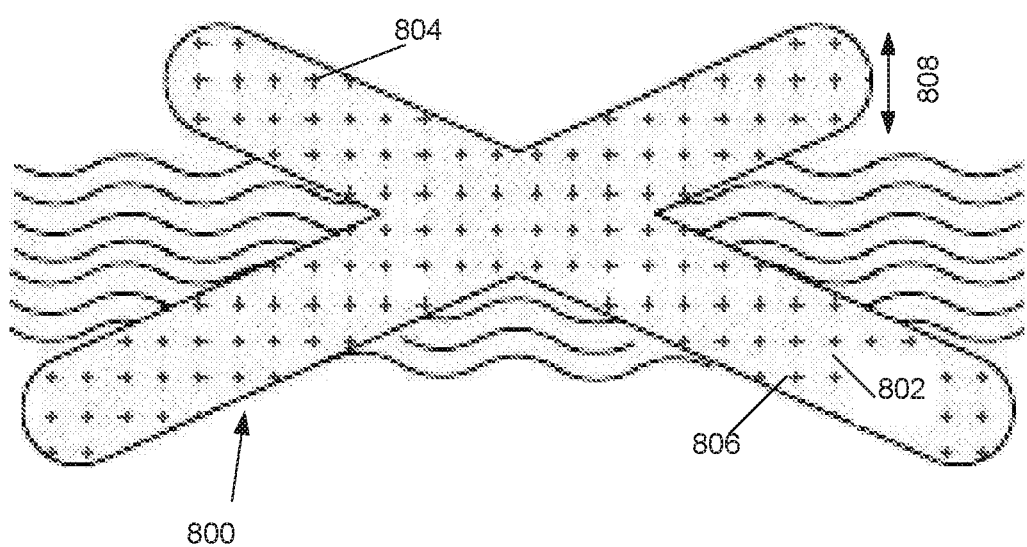
FIG. 8 is a cross section view of a SAP filled boom unit, according to some embodiments of the invention.

FIG. 8 is a cross section drawing of a SAP filled boom unit, according to some embodiments of the invention.

In some embodiments, boom unit 800 comprises one or more compartments containing SAP 802. In the example described herein, at least 95%, 90%, 80% or intermediate, larger or smaller percentages of the boom unit volume comprises SAP.

In some embodiments, floatation of the boom is obtained without the need for gas-inflatable compartments. In the example described herein, the SAP filled boom, even when absorbed with water, remains lighter than water, such as due to the existence of cavities and/or gas bubbles within the absorbed material. The SAP filled boom 800 is maintained partially above water (see portions 804 of the X shaped boom unit), and partially below water (see portions 806 of the X shaped boom unit) by buoyancy. The concept may be similar to the floating of an iceberg, which comprises a below-water portion and above water-portion, due to the fact that the ice is less dense than water, exhibiting a specific gravity smaller than that of water. Similarly, the absorbed SAP is thrust by a buoyancy force that is equal to the weight of volume of water being displaced by it, acting against the weight of the absorbed SAP which is less than the equal volume of water, causing it to partially float above water.

In some embodiments, the extent of floatation, as indicated for example by a maximal height 808 of above water portions 804 with respect to the water surface, is determined by the specific gravity of the absorbed SAP and by the shape and/or size of the boom.

In some embodiments, various portions of the boom unit comprise SAP material of various densities. Optionally, some portions of the boom unit comprise a higher density SAP, for example portion 806 which is intended to be positioned below water, and some portions comprise a lower density SAP, for example portion 804 which is intended to float above water. In some embodiments, SAP densities of various boom unit portions are selected to provide various levels of rigidity to different boom portions.

For example, a ballast compartment may comprise SAP of relatively high density to obtain increased rigidity when inflated by water. In another example, boom unit portions in proximity to a locking point may include SAP of higher density to be more rigid relative to other boom portions which contain SAP of lower density.

In an embodiment, the complete boom unit is formed of an absorbent material which comprises a specific gravity smaller than water, when the material is absorbed in water.

Figure 9:
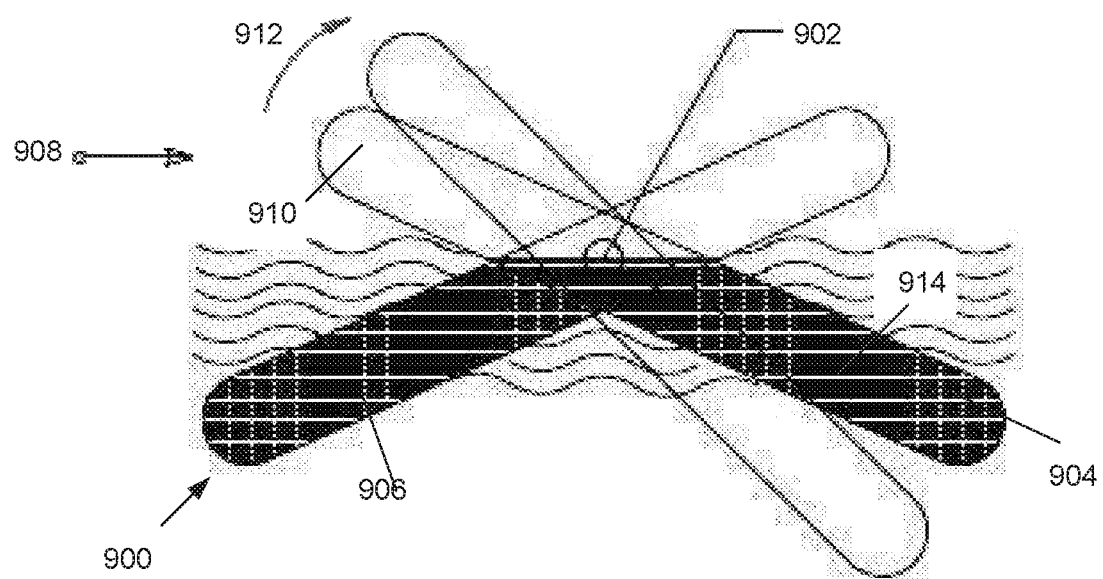
FIG. 9 is a cross section view of a boom unit comprising one or more rotational axes, according to some embodiments of the invention.

FIG. 9 is a cross section drawing of a boom unit comprising one or more rotational axis, according to some embodiments of the invention.

In some embodiments, boom unit 900 comprises one or more rotational axes, provided for example by a hinge 902 and/or other type of bearing suitable to provide for rotation of one or more compartments or portions thereof relative to other compartments or portions thereof.

In the example shown herein, the X shaped boom unit comprises two compartments 904, 906 that can be moved at an angle relative to each other by pivoting on hinge 902. In some embodiments, a compartment is moved in response an external force such as caused by a blow of wind 908. In some embodiments, wind 908 acts on a floating portion 910 of compartment 904, rotating the compartment in the direction shown by arrow 912 such that the ballast, under water portion 914 of compartment 904 is advanced to a closer to perpendicular position relative to the water surface, anchoring deeper into the water to increase the boom's resistance to being lifted by wind 908.

In some embodiments, hinge 902 is configured to limit the extent of rotation of compartment 904, for example by comprising one or more pins and/or other stopping elements. Optionally, limiting the extent of rotation prevents a situation in which compartment 904 pivots to a position in which an alignment between compartments 904 and 906 is no longer suitable to efficiently block the spill and/or to be stabilized in water, such as a position in which compartment 904 is parallel to compartment 906.

Optionally, the extent of rotation is selected to maintain an upside down V configuration between the ballast portions of the compartments.

Figure 10:
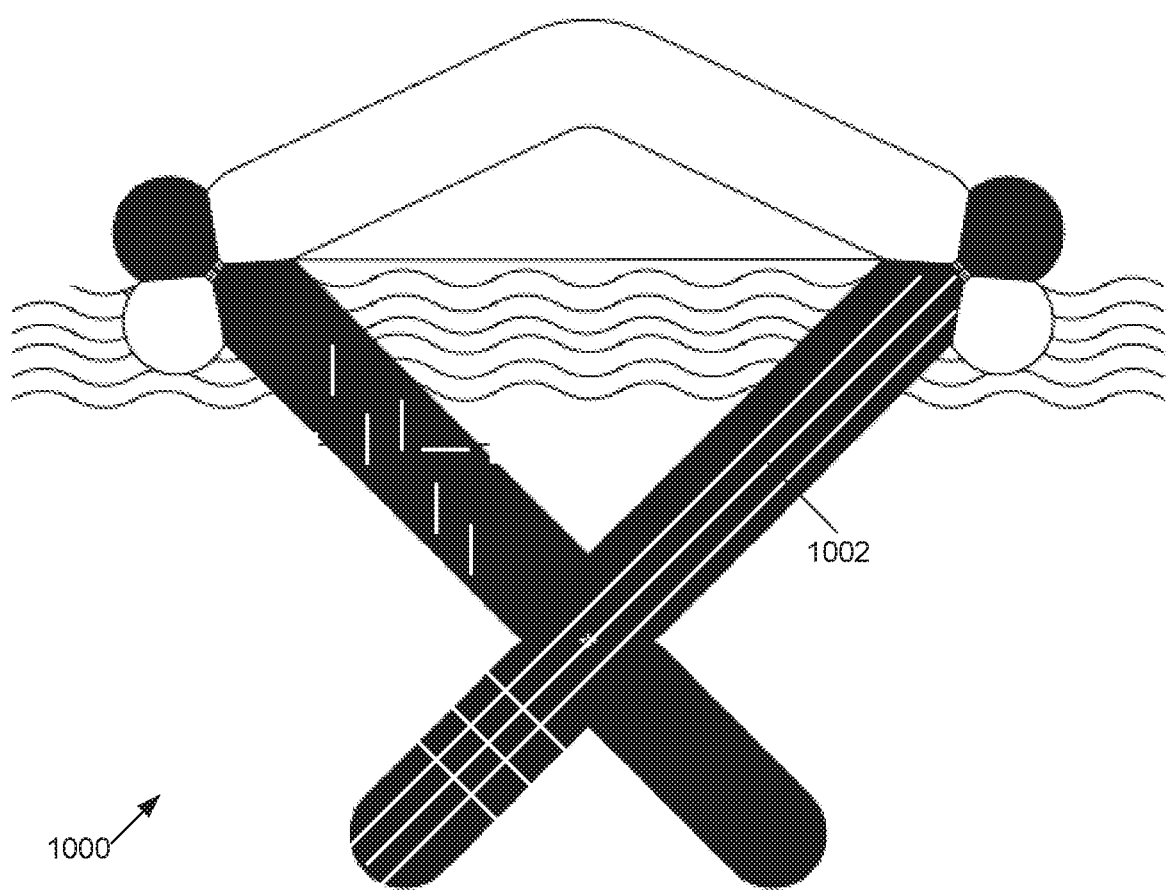
FIG. 10 is a cross section view of a boom unit comprising a fiber-reinforced structure, according to some embodiments of the invention.

FIG. 10 is a cross section view of a boom unit comprising a fiber-reinforced structure, according to some embodiments of the invention.

In some embodiments, boom unit 1000 comprises one or more fibers 1002. In some embodiments, the fibers are added to the boom material, for example added to a SAP compartment functioning as a ballast compartment (e.g., to increase a weight of the compartment and/or maintain a shape thereof).

Exemplary materials from which fibers 1002 are made of may includes metal, composite materials such as Kevlar, glass or carbon fibers, and/or plastic material. In some embodiments of the invention, the composite material is a shape memory material and/or is otherwise elastic (e.g., in the form of a spring or sponge). Optionally, this supports two states: The first is to stay flat while stored before activation of the boom—and the second—the desired functional shape. Optionally the fibers apply at least some of the forces which deploy the boom from the first state to the second state.

In some embodiments, fibers 1002 are arranged to increase the structural strength of the boom unit. In some embodiments, fibers or reinforcements are comprised within the filling material of the boom, for example extending longitudinally, transversely, and/or in an arbitrary spread as bits of fibers contained within the material. Additionally or alternatively, the fibers are comprised within the sleeve's film which surrounds the filling material. In other embodiments the fibers and/or reinforcements made of a different type of plastic are inserted into the lumen of the compartment and/or attached to walls thereof to support the stability and/or degree (e.g., partial) of rigidity of the compartment. Optionally, the fibers provide structural stability together with other elements, such as tension elements as described herein.

In some embodiments, fibers such as metal fibers are used to provide for detection of the deployed boom, for example by a radar. Optionally, such materials, for example, fibers or particles, are mixed in the SAP. Optionally or additionally, such material are provided in above-water sections of the boom only. Optionally or additionally, by providing on or in below-sections of the boom, capsizing of the boom may be detected remotely, for example, by radar.

Figure 11:
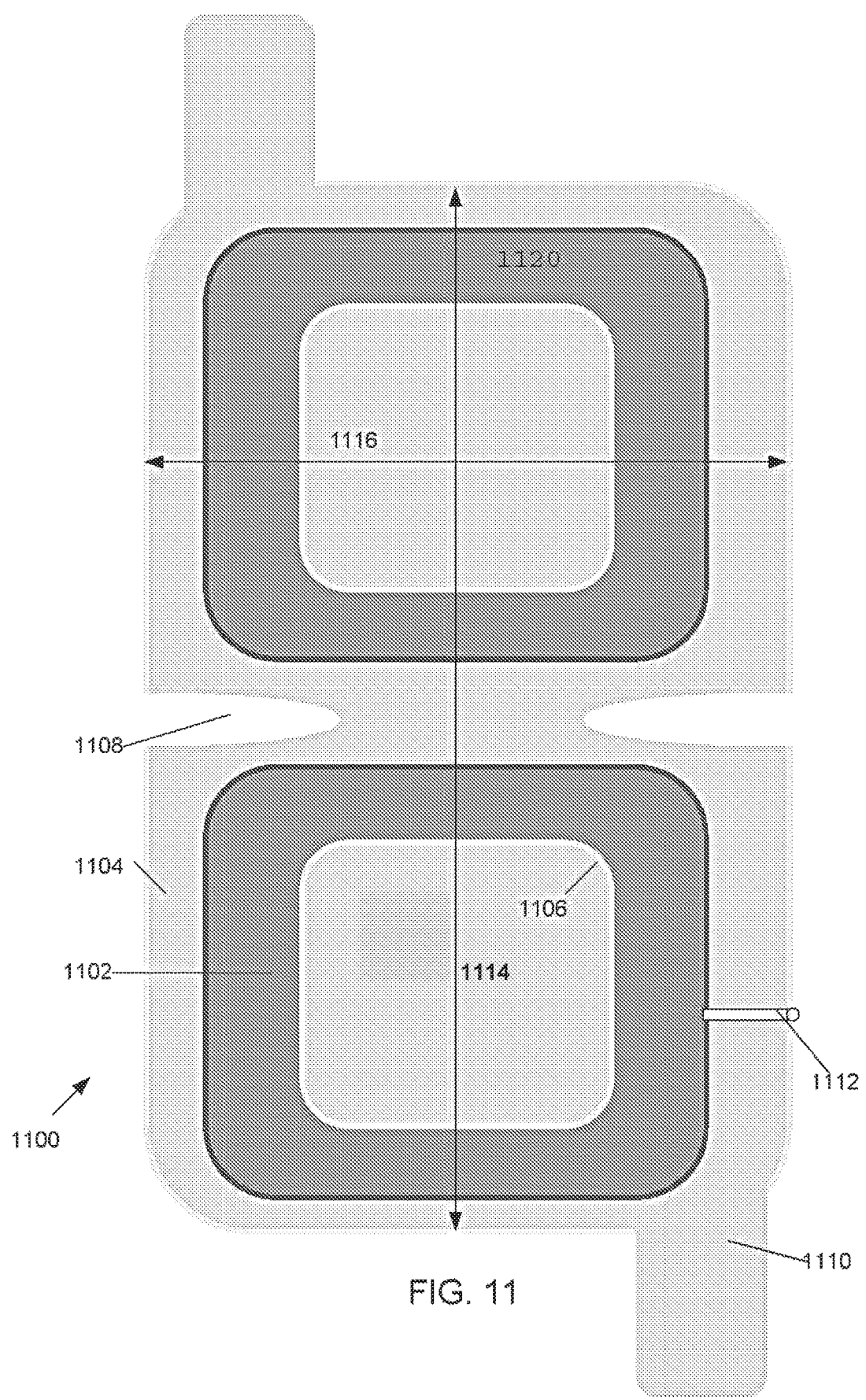
FIG. 11 is a top view of a boom sleeve segment comprising inflatable portions and sealed portions, according to some embodiments of the invention.

FIG. 11 is a top view of a boom sleeve segment comprising inflatable portions and sealed portions, according to some embodiments of the invention.

In some embodiments, sleeve segment 1100 comprises one or more inflatable portions 1102, and or more sealed areas 1104. In some embodiments, inflatable portions 1102, when inflated and/or absorbed (i.e. in cases in which the compartments contain absorbent material), become more rigid than the sealed areas 1104, functioning as beams that define a frame. In some embodiments, sealed areas 1104 which include non-inflated layers of sleeve film are flexible. Optionally, sealed areas 1104 enable folding, twisting, slightly stretching and/or approximating the inflatable compartments relative to each other.

In some embodiments, some of the inflatable portions are inflated to a lower pressure than other inflatable portions. Optionally, the lower-pressure portions are less rigid than the higher-pressure ones, and may allow, for example, slight bending of the compartments.

In some embodiments, sealed areas 1104 are shaped and/or sized to allow deformation of the inflatable portions which occurs during and/or due to inflation.

Optionally, sealed areas 1104 comprise curved edges 1106. A potential advantage of curved edges, for example in comparison to straight-edged corners, may include reducing an amount of potential points of failure, such as locations in which the boom sleeve may tear, break and/or be otherwise deformed in a non-desired manner.

Alternatively, the boom comprises straight-edged corners.

In some embodiments, a sleeve segment 1100 is coupled to one or more sleeve segments to produce one or more three dimensional boom units, for example as described herein. Optionally, each segment forms a plane of the assembled three-dimensional boom structure. In some embodiments, two or more segments are coupled to each other by one or more of respective slots 1108 and tabs 1110, a connecting element such as a strap, adhesion means such as glue, a welding such as a plastic welding, a threaded connection, for example on in which a portion of a first segment fits within and/or is passed through a recess of a second segment, and/or any other attachment means.

In some embodiments, sleeve segment 1100 comprises one or more valves 1112, through which the inflatable portions can be inflated. Optionally, valve 1112 is a one way valve, allowing for inflation only and preventing gas and/or fluid from exiting the inflatable compartments.

Exemplary dimensions of a boom sleeve segment 1100 may include a length 1114 ranging between, for example, 10-50 cm, such as 20, 30, 40 cm or intermediate, longer or shorter lengths; a width 1116 ranging between, for example, 10-50 cm, such as 10, 20, 35 cm or intermediate, longer or shorter width.

In some embodiments a boom has one or more preinflated or sealed chambers. Optionally, the form of the chambers is of bubbles formed between two welded together plastic films. Optionally or additionally, a plurality of independently sealed chambers are provided in a boom section. Optionally or additionally, a flotation chamber includes an insert in the form of a plurality of plastic-sealed gas units, optionally arranged in an array (e.g., similar to the deign used for bubble wrap) or in an grid of (for example) rectangular, circular or hexagonal air filled chambers, in bubble form factor or any other form.

Section 1120 is shown with no air inlet and optionally serves as a prefilled gas flotation chamber.

FIG. 12 is a cross-sectional view of a chamber wall shaped to create a one way valve therein (e.g., for allowing water ingress and preventing SAP exit), in accordance with some embodiments of the invention.

As shown the wall of a chamber 1200 includes a plurality of openings, each including two lips 1202 and 1204, together defining a valve 1206. Optionally, the lips are part of the material of the wall (e.g., formed by stretching, pulling and/or heating the wall material and/or by molding thereof). Optionally or additionally, the lips are attached, for example, by welding, at least in part. Optionally, the lips are separate lips.

More than two lips per valve may be provided. Alternatively, the lips may be in the form of a funnel. Optionally or additionally, a single lip is provided (which optionally closes against the wall, for example, like a flap valve). The lips are optionally pliable. If resilient, the lips are optionally predisposed to an open position of the valve.

When the internal pressure of the chamber grows, for example, due to sufficient ingress of water and/or due to expansion of SAP, internal pressure Pint on lips 1202, 1204 increases and causes closure, at least in part of valve 1206. Optionally, this prevents SAP particles from exiting chamber 1200. Sufficient expansion of SAP may even increase Pint above the external pressure Pext.

Optionally, such valves are used for chambers which do not include water absorbing material such as SAP and/or which do not contain enough material to directly close the valve.

Figure 13C:
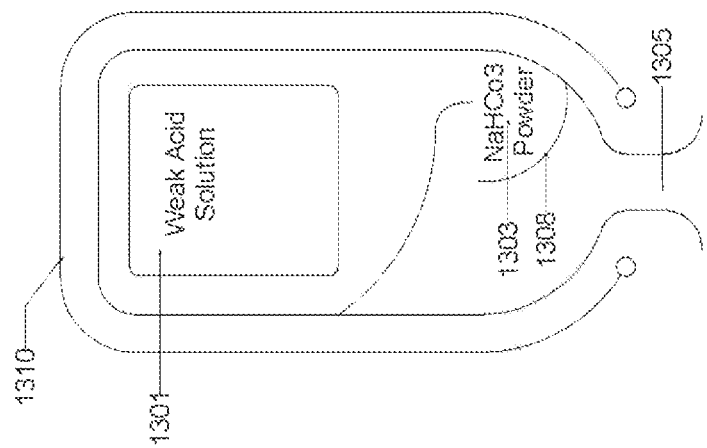
FIGS. 13A-13C illustrate a plurality of configurations for separate storing of gas-forming materials, in accordance with some embodiments of the invention.
Figure 13B:
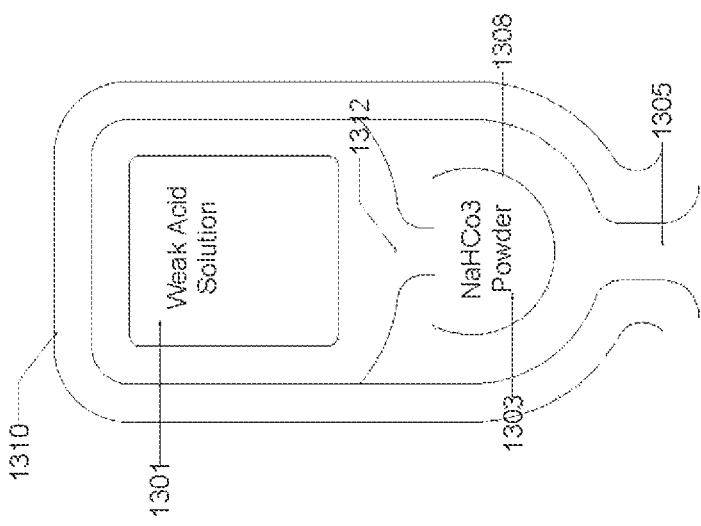
Figure 13A:
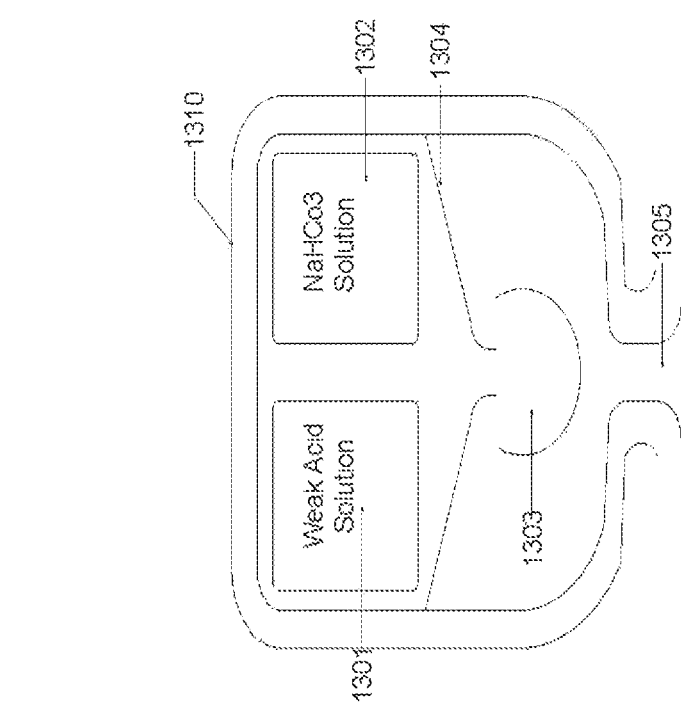

FIGS. 13A-13C illustrate a plurality of configurations for separate storing of gas-forming materials (e.g., liquids and/or powder), in accordance with some embodiments of the invention.

FIG. 13A shows a design in which a unit having a wall 1310 includes two packets 1301 with an acid (or other first precursor) and 1302 with a base or salt (or other suitable precursor). When compressed, the packets burst and they flow in a path guided by an optional wall 1304 or other structure of the unit to a mixing chamber 1303. After mixing, released gas can flow out to fill the unit and/or exit via an opening 1305 to fill other parts of a chamber to which the unit is connected.

FIG. 13B shows an alternative design, where one precursor is in powder form 1308 and is located within mixing chamber 1303, optionally adhered to a wall thereof and/or in a porous bag.

FIG. 13C shows an alternative design in which mixing chamber 1303 shares a wall 1310 of the unit.

In some embodiments of the invention, the gas creation process is activated by crushing the inner packet or packets and allowing the chemicals to react. As illustrated, the unit design forces both chemicals to mix before and/or during their flow away from their packet(s). In some embodiments of the invention, the crushing mechanism (e.g., rolls or press that start the process), is positioned to activate the process in the desired area (e.g., being aligned vertically and/or horizontally and/or axially and/or transversely with the known location of the packets (themselves aligned by geometry to the delivery system)). Optionally, crushing direction is selected to encourage flow in a desired direction (e.g., proceeding downwards in the figures.

Figure 14:
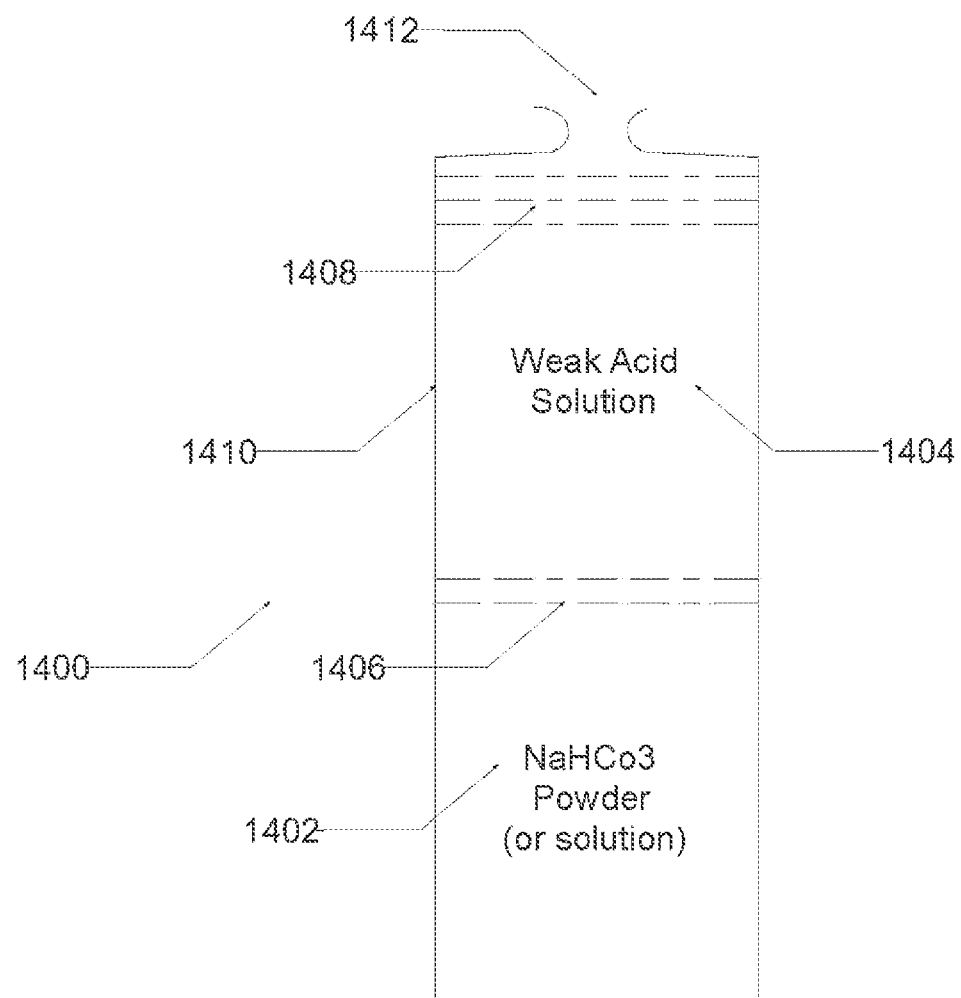
FIG. 14 illustrates an alternative configuration for separate storing of gas-forming materials, in accordance with some embodiments of the invention.

FIG. 14 illustrates an alternative configuration 1400 for separate storing of gas-forming materials, in accordance with some embodiments of the invention.

Configuration 1400 utilizes welding (or adhesion) of various strengths and/or reliability to provide both storage and controlled release of gas, in accordance with exemplary embodiments of the invention.

In the embodiment shown, a first precursor, for example, $NaHCo_3$ powder, paste or solution is provided in a first compartment 1402 and separated by a relatively weak weld (or adhesive or other seal) 1406 from a second compartment 1404 which includes a second (and so one if a third precursor is used). The compartment itself is bounded by relatively strong material and where welded a strong weld 1410 is used.

When configuration 1400 is crushed, weak weld 1406 fails, rather than weld 1410, allowing the two precursors to mix. The formed gas optionally exist through an optional weld (or other bonding) of intermediate strength 1408, which resists the force that tears weld 1406, but fails when internal gas pressure is high enough. Gas can then flow through a passageway 1412 to the rest of the compartment to be expanded.

FIGS. 15A-15D and 15G illustrate an expanding boom section using a super absorbent polymer (SAP), in accordance with some embodiments of the invention.

Figure 15A:
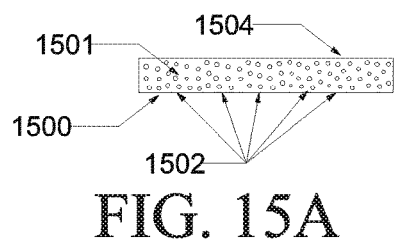
FIGS. 15A-15D and 15G illustrate an expanding boom section using a super absorbent polymer (SAP), in accordance with some embodiments of the invention.

FIG. 15A shows a unit 1500 in cross-sectional view. Unit 1500 may be, for example, a boom section or may be placed within a boom section. A plurality of SAP particles 1501 are found within unit 1500. Due to the spaces between them section 1500 may be compressible. A plurality of pores or other openings 1502 are indicated in a wall of unit 1500. Optionally or additionally, a wall 1504 of unit 1500 is formed of a porous material, such as a woven or non-woven fabric (FIG. 15G).

In some embodiments of the invention, at least one wall is oil-resistant.

Optionally, both walls include pores therein for water ingress.

Figure 15B:
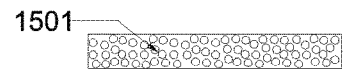

FIG. 15B shows unit 1500 after some ingress of water. SAP particles 1501 are shown to have grown by absorbing water.

Figure 15C:
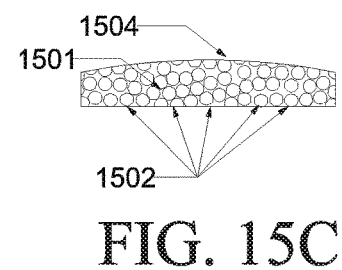

In FIGS. 15C and then 15D, even more water is absorbed, potentially causing deformation and/or other expansion of unit 1500. Optionally, wall 1504 is flexile and/or is prefolded so it can expand. In either case, the end result may include one or more walls that bulge out. Optionally, the opposing wall is more rigid so that bulging and/or other deformation is mostly limited to desired walls and/or sections thereof.

FIG. 15G is a side perspective view showing a fabric/porous layer 1504 acting as one wall of unit 1500 and SAP particles 1501 within the unit.

In some embodiments of the invention, a semi rigid plastic material, for example, PVC, PET, PP or other plastics are formed to create a cell shape using a thermoforming or other process. Optionally, this allows at least one wall to be semi rigid or rigid.

Optionally, the cell walls are drilled or punctured to form openings 1502 optionally in a pattern which allows a relatively uniform ingress of water. Optionally, the hole size is selected to let the water in, but not let the SAP gel out. The cell is then filled with dry SAP granules (1501) which are optionally spread homogenously into the cell's internal space.

Optionally, SAP distribution is either by spraying or brushing the cell's walls with glue and then covering it with SAP granules. Optionally, unadhered SAP is then removed.

Figure 15E:
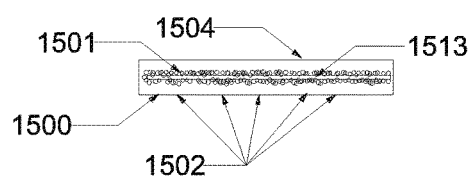
FIGS. 15E-15F illustrate boom sections with alternative SAP configurations, in accordance with some embodiments of the invention.
Figure 15D:
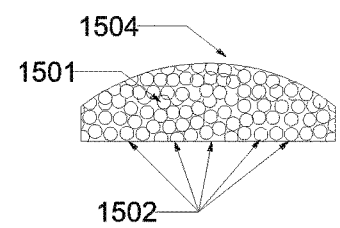

FIG. 15E shows an alternative design where SAP is attached to a backbone, rigid or flexible, for example, double sided tape 1503. This backbone can then be inserted into cell 1500.

Figure 15F:
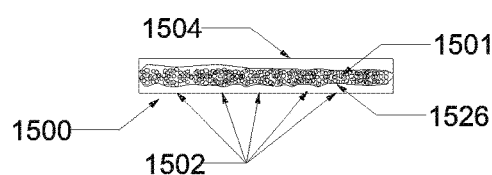
Figure 15G:
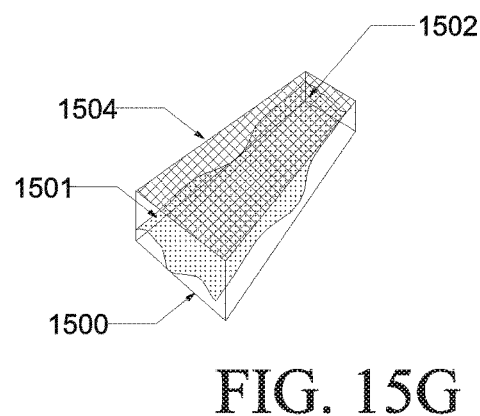

FIG. 15F shows an alternative design where the SAP is held in a bag 1526, for example, a bag formed of woven and/or nonwoven fabric and having at least one porous and/or apertured area and/or using a porous fabric.

Optionally, wall 1504 is used to seal unit 1500 after its manufacture and/or filling. Optionally, sealing is using glue and/or welding of a flexible sheet 1504 to semi-rigid sections of unit 1500.

Figure 16A:
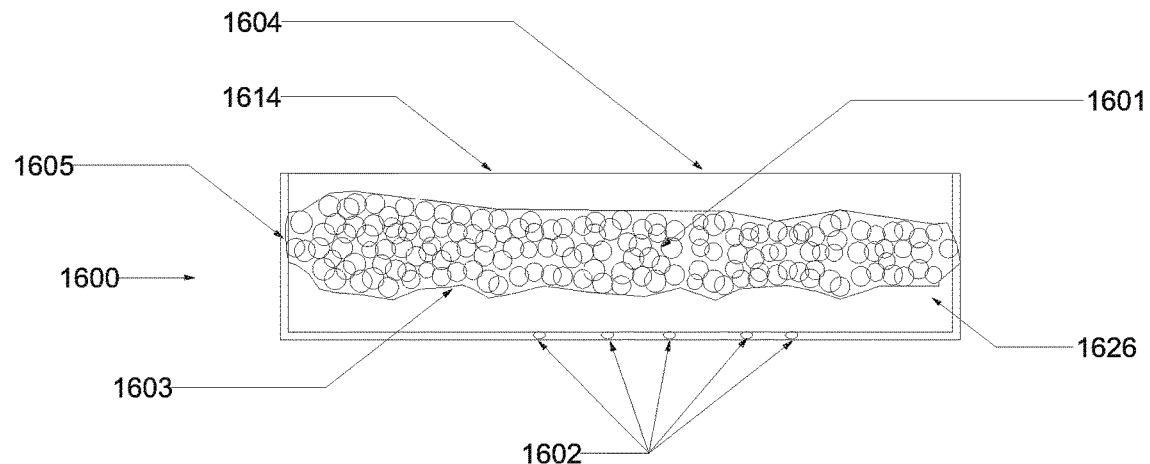
FIGS. 16A-16B illustrate boom sections with additional alternative configurations, in accordance with some embodiments of the invention.
Figure 16B:
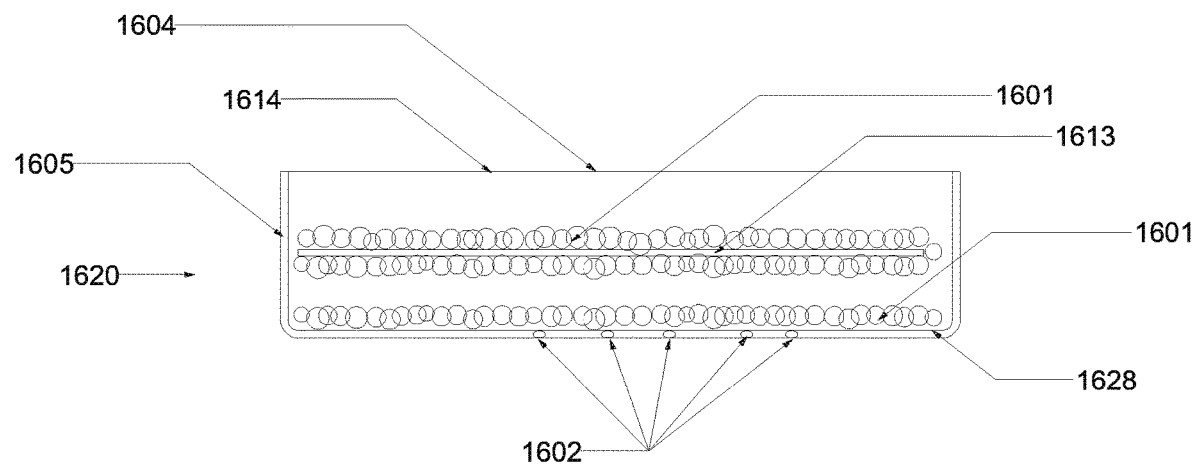

FIGS. 16A-16B illustrate boom sections with additional alternative configurations, in accordance with some embodiments of the invention.

FIG. 16A is a cross-sectional view of a boom section 1600 with an internal volume 1626 and having a semi-rigid or rigid shell 1605. SAP 1601 is provided as an insert 1603, for example a bag, in volume 1612. Section 160 is closed using a flexible membrane 1614 and/or a porous (e.g., fabric) layer 1614. Optionally, one of both of 1604 and 1614 are oil resistant. Optionally, a plurality of apertures 1602 are formed in the semi-rigid shell section 1605 to allow water ingress (and then reach and pass through the wall of bag 1603 and be absorbed in and deform SAP 1601). Optionally or additionally, water passes through layer 1614. Optionally, layer 1604 deforms once SAP 1601 expands enough.

FIG. 16B shows an alternative design, of a boom section 1620, in which SAP 1601 is attached on two sides of a double layer tape 1613 or other backbone. Optionally or additionally, SAP 1601 is provided adhered to wall 1605, for example, using an adhesive layer 1628.

It is expected that during the life of a patent maturing from this application many relevant water absorbing materials will be developed; the scope of this term is intended to include all such new technologies a priori.

As used herein with reference to quantity or value, the term "about" means "within ±10% of".

The terms "comprises", "comprising", "includes", "including", "has", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular forms "a", "an" and "the" include plural references unless the context clearly dictates otherwise. For example, the term "a compound" or "at least one compound" may include a plurality of compounds, including mixtures thereof.

Throughout this application, embodiments of this invention may be presented with reference to a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Unless otherwise indicated, numbers used herein and any number ranges based thereon are approximations within the accuracy of reasonable measurement and rounding errors as understood by persons skilled in the art.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A spill containment boom unit for deployment in ambient water in an axially extending arrangement, comprising:
   one or more surfaces configured to form at least one hollow chamber with said one or more surfaces substantially surrounding the hollow chamber in a plane transverse to an axis of said axially extending arrangement, wherein a profile of said hollow chamber is defined by meeting points, where said meeting points are meeting points between said plurality of surfaces;
   wherein a plurality of said one or more surfaces each define a wall of a compartment filled with gas; and
   wherein sponge material is provided at a location exposed to the ambient water when said boom unit is deployed, said sponge material suitable for assisting in setting a shape of said boom unit when said boom unit is deployed, said sponge material configured for absorbing a portion of the ambient water and changing shape thereby providing said assisting, said sponge material provided one or both of (a) within at least a compartment having a wall thereof defined by one of said one or more surfaces; and (b) between compartments each of which has a wall thereof defined by one of said one or more surfaces;
   wherein when said boom unit is deployed, said hollow chamber defines one or more openings through which ambient water can flow.

2. The boom unit according to claim 1, wherein said hollow chamber is configured to assist in stabilizing a structure of said boom unit against externally acting forces.

3. The boom unit according to claim 1, wherein said meeting points restrict at least some movement of said walls or portions of a wall relative to each other to at least one of (a) maintain a structure of said boom unit stabilized and (b) prevent said hollow chamber from opening or changing shape or angle.

4. The boom unit according to claim 1, wherein said hollow chamber is defined by a plurality of bending regions which are parts of the boom unit adapted to bend and are thinner than fillable or filled parts of said boom unit.

5. The boom unit of claim 1, wherein at least one of said compartments each includes at least one porous wall or wall with openings sized to allow water ingress into an interior thereof.

6. The boom unit according to claim 5, comprising a ballast compartment defining at least a portion of a wall of said hollow chamber.

7. The boom unit of claim 1, wherein said sponge material is provided between compartments.

8. The boom unit according to claim 1, comprising at least one connecting element for connecting between at least two compartments, said at least one connecting element comprising an element inserted at production stage of the boom unit and has a mechanism that is locked when the boom unit is deployed and keeps the boom unit open.

9. The boom unit according to claim 1, wherein said hollow chamber at least partially limits movement of ambient fluid when said boom unit is deployed, such that a stability of said boom unit is increased.

10. The boom unit according to claim 1, wherein said boom unit comprises an underwater portion and an above water portion, said hollow chamber is configured in one or both of said underwater portion and said above water portion and wherein said underwater portion extending to a distance of 20-50 cm below water surface.

11. The boom unit according to claim 1, wherein said walls of said hollow chamber define an inner surface, said inner surface defining an open area of between 5% and 50% of a geometrical surface of said hollow chamber.

12. The boom unit according to claim 1, further comprising one or more additional compartments which do not form said hollow chamber.

13. The boom unit according to claim 1, wherein said boom unit comprises one or more ballast compartments arranged in an X-shaped cross-sectional profile, forming a below water portion of said boom unit, and wherein said plurality of gas-filled compartments form an above water portion of said boom unit.

14. The boom unit according to claim 1, wherein said boom unit defines an A shaped cross-sectional profile, wherein one or more ballast compartments form the legs of said A and wherein said plurality of gas-filled compartments form a horizontally extending line of said A shaped cross-sectional profile.

15. The boom unit according to claim 1, wherein said boom unit defines a cross-sectional profile including an X-shaped intersection under water and an upside-down V above water.

16. The boom unit according to claim 1, wherein said gas-filled compartments are each pre-filled and sealed during manufacture with a gas in an amount sufficient to provide at least 50% of a buoyancy of said boom unit.

17. The boom unit according to claim 16, comprising gas in an amount sufficient to provide at least 80% of a buoyancy of said boom unit.

18. The boom unit according to claim 16, wherein said pre-filled and sealed gas compartments each comprises said gas while in a storage configuration.

19. The boom unit according to claim 16, wherein said pre-filled and sealed gas compartments each comprises said gas while in a folded configuration.

20. The boom unit according to claim 1, wherein said sponge material comprises foam material.

21. The boom unit according to claim 1, wherein energy released by said sponge material is invested in changing said boom unit from a flat position into a three dimensional structure.

22. The boom unit according to claim 1, wherein said hollow chamber comprises a polygonal cross section profile.

23. The boom unit according to claim 1, wherein a shape of said hollow chamber is suitable to slow volumetric flow of ambient water in and/or out a volume of said hollow chamber.

24. The boom unit according to claim 1, wherein at least one wall of said hollow chamber is semi-rigid or includes a stiffening element.

25. The boom unit according to claim 1, comprising a connecting portion extending between at least two of said walls which form said hollow chamber.

26. The boom unit according to claim 1, wherein each of said plurality of gas-filled compartments comprises a flattened compartment.

27. The boom unit according to claim 1, wherein a volume of said hollow chamber is at least 100% of a volume of all said compartments surrounding the hollow chamber.

28. The boom unit according to claim 1, wherein said sponge material is provided between compartments.

29. The boom unit according to claim 1, wherein all sides of said hollow chamber are defined directly by sides of said compartments.

30. The boom unit according to claim 1, wherein said providing said assisting includes—increasing an angle between at least some of said plurality of compartments.

31. The boom unit according to claim 1, wherein said providing said assisting includes pushing apart at least some of said plurality of compartments.

32. The boom unit according to claim 1, wherein said hollow chamber comprises a polygonal profile.

33. The boom unit according to claim 32, wherein said hollow chamber comprises one of a triangular profile and a hexagonal profile.

34. The boom unit according to claim 1, wherein said sponge is sealed with a plastic configured to melt in said ambient water.

35. The boom unit according to claim 34, wherein said sponge includes a SAP (super absorbent polymer).

36. The boom unit according to claim 1, wherein said sponge is configured to absorb at least 10 times, at least 50 times, at least 100 times, or at least 500 times a weight of a material of said sponge.

37. The boom unit according to claim 1, wherein said sponge includes SAP in the form of at least one of powder, woven fibers, and unwoven fibers.

38. The boom unit according to claim 1, wherein said sponge material includes SAP contained inside a sleeve film forming walls of ballast compartments.

39. The boom unit according to claim 1, wherein said hollow chamber is configured to maintain said set shape said boom unit when deployed.

40. The boom unit according to claim 1, wherein when said boom unit is deployed, said hollow chamber sized to interfere with the motion of a volume of said ambient water contained within said hollow chamber, said volume sufficient for stabilizing said boom unit.

41. The boom unit according to claim 1, wherein said meeting points are meeting points at one or both of:
    between ballast compartments; and
    between flotation compartments and ballast compartments.

42. The boom unit according to claim 1, wherein each of said meeting points is at least one of:
    a crossing point between compartments of said plurality of compartments;
    a bend of a compartment of said plurality of compartments;
    a threaded connection between two or more interleaved compartments of said plurality of compartments; and
    a glued and/or welded connection; and/or other geometrical junction which, along with one or more additional geometrical junctions, defines a framed structure.

43. The boom unit according to claim 1, further comprising at least one tensile element across said hollow chamber for at least one of supporting stability and a degree of rigidity of at least one said compartment.

44. The boom unit according to claim 43, wherein said at least one tensile element is provided at least one of between gas-filled compartments, between a gas-filled compartment and a water compartment, and between water compartments.

45. The boom unit according to claim 43, wherein said at least one tensile element is elastic.

46. A spill containment boom unit for deployment in ambient water in an axially extending arrangement, comprising:
    one or more surfaces configured to form at least one hollow chamber with said one or more surfaces substantially surrounding the hollow chamber in a plane transverse to an axis of said axially extending arrangement;
    wherein a plurality of said one or more surfaces each define a wall of a compartment filled with gas; and
    wherein sponge material is provided at a location exposed to the ambient water when said boom unit is deployed, —said sponge material suitable for assisting in setting a shape of said boom unit when said boom unit is deployed, said sponge material configured for absorbing a portion of the ambient water and changing shape thereby providing said assisting, said sponge material provided one or both of (a) within at least a compartment; and (b) between compartments;
    wherein when said boom unit is deployed, said hollow chamber defines one or more openings through which ambient water can flow.

* * * * *